(12) United States Patent
Chen et al.

(10) Patent No.: US 7,001,648 B2
(45) Date of Patent: Feb. 21, 2006

(54) GLASSY CHIRAL-NEMATIC LIQUID CRYSTALS AND OPTICAL DEVICES CONTAINING SAME

(75) Inventors: Shaw H. Chen, Penfield, NY (US); Huang-Ming Philip Chen, Penfield, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 10/805,150

(22) Filed: Mar. 19, 2004

(65) Prior Publication Data

US 2005/0263741 A1 Dec. 1, 2005

Related U.S. Application Data

(60) Provisional application No. 60/456,782, filed on Mar. 21, 2003.

(51) Int. Cl.
- *C09K 19/32* (2006.01)
- *C09K 19/30* (2006.01)
- *C09K 19/12* (2006.01)
- *C09K 19/20* (2006.01)
- *C09K 19/36* (2006.01)

(52) U.S. Cl. ............... 428/1.1; 428/1.3; 252/299.01; 252/299.62; 252/299.63; 252/299.64; 252/299.65; 252/299.66; 252/299.67; 252/299.7

(58) Field of Classification Search ......... 252/299.01, 252/299.62, 299.63, 299.64, 299.65, 299.67, 252/299.66, 299.7; 428/1.1, 1.3, 1.31
See application file for complete search history.

(56) References Cited

U.S. PATENT DOCUMENTS 4,410,570 A 10/1983 Kreuzer et al.
5,362,315 A 11/1994 Muller-Rees et al.
5,378,393 A 1/1995 Chen et al.
5,417,882 A 5/1995 Bach et al.
5,514,296 A 5/1996 Chen et al.
5,682,212 A 10/1997 Maurer et al.
5,683,622 A 11/1997 Kratzschmar et al.
5,695,680 A 12/1997 Weitzel et al.

(Continued)

FOREIGN PATENT DOCUMENTS

DE 3732115 A1 4/1989

OTHER PUBLICATIONS

Sorai, M. et al., Glassy Liquid Crystal of the Nematic Phase of N-(o-Hydroxy-p-methoxybenzylidene)-p-butylaniline, S. Bull. Chem. Soc. Jpn., vol. 44, p. 2887 (1971).

(Continued)

*Primary Examiner*—SHean C. Wu
(74) *Attorney, Agent, or Firm*—Kenneth J. Lukacher

(57) ABSTRACT

A glassy chiral-nematic liquid crystal composition includes a compound having the structural formula

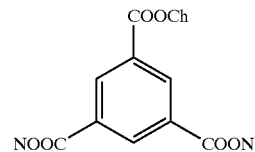

wherein each N represents a nematic group connected to the 1, 3, 5-benzenetricarbonyl central moiety by a carboxylic ester linkage and Ch represents a chiral group connected to the central moiety by a carboxylic ester linkage. An optical device is formed from at least one of the glassy chiral-nematic liquid crystal compositions.

35 Claims, 10 Drawing Sheets

U.S. PATENT DOCUMENTS

| | | | | |
|---|---|---|---|---|
| 5,804,097 | A | * | 9/1998 | Delavier et al. ....... 252/299.63 |
| 5,827,449 | A | | 10/1998 | Hanelt et al. |
| 6,071,438 | A | | 6/2000 | Leigeber et al. |
| 6,248,259 | B1 | | 6/2001 | Izumi et al. |
| 6,423,246 | B1 | | 7/2002 | Kasch et al. |
| 6,558,572 | B1 | * | 5/2003 | Chen et al. .............. 252/299.1 |
| 6,730,242 | B1 | * | 5/2004 | Chen et al. ............ 252/299.01 |
| 2002/0086113 | A1 | | 7/2002 | Leigeber et al. |

OTHER PUBLICATIONS

Tsuji, K. et al., New Finding of Glassy Liquid Crystal—a Non-equilibrium State of Cholesteryl Hydrogen Phthalate, S. Bull. Chem. Soc. Jpn., vol. 44, p. 1452 (1971).

Wedler, W. et al., Vitrification in Low-molecular-weight Mesogenic Compounds, J. Mater. Chem., vol. 1, pp. 347-356, (1991).

Attard, G. et al., Liquid-crystalline and glass-forming dimers derived from 1-aminopyrene, Liquid Crystals, vol. 11, No. 5, pp. 785-789, (1992).

Dehne, H. et al., Sulphur ligated siamese twin mesogens, Liquid Crystals, vol. 6, No. 1, pp. 47-62, (1989).

Attard, G. et al., Low Molar Mass Liquid-Crystalline Glasses: Preparation and Properties of the α-(4Cyanobiphenyl-4'-oxy)-ω-(1-pyreniminebenzylidene-4'-oxy)alkanes, Chem. Mater., vol. 4, pp. 1246-1253, (1992).

Tamaoki, N. et al., Optical and thermal properties of cholesteric solid from dicholesteryl esters of diacetylenedicarboxylic acid, J. Mater. Chem., vol. 9, pp. 2381-2384, (1999).

Kreuzer, F. et al., Cyclic Siloxanes with Mesogenic Side Groups, Mol. Cryst. Liq. Cryst., vol. 199, pp. 345-378, (1991).

Kreuzer, F. et al., Liquid-crystalline Silsesquioxanes, Makromol. Chem., Macromol. Symp. vol. 50, pp. 215-228, (1991).

Gresham, K. et al., Phase Behavior of Cyclic Siloxane-Based Liquid Crystalline Compounds, J. Polym. Sci., Part A: Polym. Chem. vol. 32, pp. 2039-2047, (1994).

Lorenz, K. et al., A Mesogen-Functionalized Carbosilane Dendrimer: A Dendritic Liquid Crystalline Polymer, Adv. Mater., vol. 8, No. 5, pp. 414-416, (1996).

Ponomarenko, S. et al., Carbosilane Liquid Crystalline Dendrimers: From Molecular Architecture to Supramolecular Nanostructures, Macromolecules, vol. 33, No. 15, pp. 5549-5558, (2000).

Saez, I. et al., A Liquid-Crystalline Silsesquioxane Dendrimer Exhibiting Chiral Nematic and Columnar Mesophases, Chem. Eur. J., vol. 7, No. 13, pp. 2758-2764, (2001).

Percec, V. et al., Synthesis and Characterization of Cyclic Liquid Crystalline Oligomers Based on 1-(4-Hydroxy-4'-biphenylyl)-2-(4-hydroxyphenyl)butane and 1,10-Dibromodecane, Macromolecules, vol. 25, No. 15, pp. 3851-3861, (1992).

Shi, H. et al., Novel glassy nematic and chiral nematic oligomers derived from 1,3,5-cyclohexanetricarboxylic and (1R,3S)-(+)-camphoric acids, Liquid Crystals, vol. 17, No. 3, pp. 413-428, (1994).

Shi, H. et al., Novel glass-forming liquid crystals II. Systems containing 1-phenyl-2-(6-cyanonaphth-2-yl)ethyne as a high optical birefringence moiety, Liquid Crystals, vol. 18, No. 5, pp. 733-741, (1995).

Mastrangelo, J. et al., Crystallization upon thermal annealing of a glass-forming liquid crystal in the nematic regime, Appl. Phys. Lett. vol. 66, No. 17, pp. 2212-2214, (1995).

Shi, H. et al., Effects of stereochemistry, mesogenic core and spacer length on crystallization from nematic and isotropic melts of cyclohexane-based glass-forming liquid crystals, Liquid Crystals, vol. 19, No. 6, pp. 785-790, (1995).

Chen, S. et al., Novel Glass-Forming Organic Materials. 1. Adamantane with Pendant Cholesteryl, Disperse Red 1, and Nematogenic Groups, Macromolecules, vol. 28, No. 23, pp. 7775-7778, (1995).

Shi, H. et al., Novel glass-forming liquid crystals. III Helical sense and twisting power in chiral nematic systems, Liquid Crystals, vol. 19, No. 6, pp. 849-861, (1995).

De Rosa, M. et al., Dynamic Mechanical Relaxation Behavior of Low Molecular Weight Side-Chain Cyclic Liquid Crystalline Compounds near the Glass Transition Temperature, Macromolecules, vol. 29, No. 17, pp. 5650-5657, (1996).

Chen, S. et al., Novel glass-forming liquid crystals. IV. Effects of central core and pendant group on vitrification and morphological stability, Liquid Crystals, vol. 21, No. 5, pp. 683-694, (1996).

Chen, S. et al., Novel Vitrifiable Liquid Crystals as Optical Materials, Adv. Mater., vol. 8, No. 12, pp. 998-1001, (1996).

Chen, S. et al., Novel Glass-Forming Organic Materials. 3. Cubane with Pendant Nematogens, Carbazole, and Disperse Red 1, Macromolecules, vol. 30, No. 1, pp. 93-97, (1997).

Chen, S. et al., Circularly polarized light generated by photoexcitation of luminophores in glassy liquid-crystal films, Nature, vol. 397, pp. 506-508, (1999).

Fan, F. et al., Novel Glass-Forming Liquid Crystals. 6. High-Temperature Glassy Nematics, Chem. Mater. vol. 13, No. 12, pp. 4584-4594, (2001).

Fan, F. et al., Novel glass-forming liquid crystals V. Nematic and chiral-nematic systems with an elevated glass transition temperature, Liquid Crystals, vol. 27, No. 9, pp. 1239-1248, (2000).

Katsis, D. et al., Vitrified Chiral-Nematic Liquid Crystalline Films for Selective Reflection and Circular Polarization, Chem. Mater., vol. 11, No. 6, pp. 1590-1596, (1999).

Chen, H. et al., Glass Liquid-Crystal Films with Opposite Chirality as High-Performance Optical Notch Filters and Reflectors, Adv. Mater., vol. 12, No. 17, pp. 1283-1286, (2000).

Ohno, M. et al., Chiral Synthons by Ester Hydrolysis Catalyzed by Pig Liver Esterase, M. Org. React. vol. 37, pp. 1-55, (1989).

Engel, M. et al., Regiospecific Synthesis of 3,5-Bis (bromomethyl)benzoic Acid, A Cysteine Crosslinking Agent, Tetrahedron, vol. 49, No. 39, pp. 8761-8770, (1993).

Dreher, R. et al., Optical Properties of Cholesteric Liquid Crystals, Physical Review A, vol. 8, No. 3, pp. 1616-1623, (1973).

Beginn, U. et al., Liquid Crystalline Primary Benzamides, Mol. Cryst. Liq. Cryst., vol. 241, pp. 215-219, (1994).

* cited by examiner

GLASSY CHIRAL-NEMATIC LIQUID CRYSTALS AND OPTICAL DEVICES CONTAINING SAME

This application claims the benefit of Provisional Application Ser. No. 60/456,782, filed Mar. 21, 2003 for GLASSY CHIRAL-NEMATIC LIQUID CRYSTALS AND OPTICAL DEVICES CONTAINING SAME, the disclosure of which is incorporated herein by reference.

The United States Government has rights in this invention pursuant to Grant Nos. CTS-0204827 and CTS-9816234 from the National Science Foundation, Grant No. DAAD 19-01-1-0676 from the U.S. Army Research Office, and Grant No. N00014-02-M-0244 from the Office of Naval Research.

FIELD OF THE INVENTION

The present invention relates to glassy chiral-nematic liquid crystals and to optical devices formed therefrom.

BACKGROUND OF THE INVENTION

Liquid crystals are fluids characterized by various forms of long-range molecular order. These materials have found extensive uses in switchable electro-optical devices, such as liquid crystal displays and spatial light modulators. For many photonic applications it is desirable to have materials capable of freezing liquid crystalline order into solid state without crystallization, representing a unique class of advanced materials referred to as glassy liquid crystals, (GLCs). Existing GLCs can be categorized as follows:

laterally or terminally branched, one-string compounds with a glass transition temperature, $T_g$, mostly around room temperature [cf. Sorai, M.; Seki, S. *Bull. Chem. Soc. Jap.* 1971, 44, 2887; Tsuji, K.; Sorai, M.; Seki, S. *Bull. Chem. Soc. Jap.* 1971, 44, 1452; Wedler, W.; Demus, D.; Zaschke, H.; Mohr, K.; Schafer, W.; Weissflog, W. *J Mater. Chem.* 1991, 1, 347.];

twin molecules with an above-ambient $T_g$ but generally lacking morphological stability [cf. Attard, G. S.; Imrie, C. T. *Liq. Cryst.* 1992, 11, 785; Dehne, H.; Roger, A.; Demus, D.; Diele, S.; Kresse, H.; Pelzl, G.; Weissflog, W. *Liq. Cryst.* 1989, 6, 47; Attard, G. S.; Imrie, C. T.; Karasz, F. E. *Chem. Mater.* 1992, 4, 1246; Tamaoki, N.; Kruk, G.; Matsuda, H. *J. Mater. Chem.* 1999, 9, 2381]; cyclosiloxanes functionalized with mesogenic and chiral pendants [cf. Kreuzer, F. H.; Andrejewski, D.; Haas, W.; Haberle, N.; Riepl, G.; Spes, P. *Mol. Cryst. Liq. Cryst.*, 1991, 199, 345; Kreuzer, F. H.; Maurer, R.; Spes, P. *Makromol. Chem., Macromol. Symp.* 1991, 50, 215; Gresham, K. D.; McHugh, C. M.; Bunning, T. J.; Crane, R. J.; Klei, H. E.; Samulski, E. T. *J Polymer Sci.: Part A: Polymer Chem.* 1994, 32, 2039];

carbosilane dendrimers exhibiting a low $T_g$[cf. Lorenz, K.; Hölter, D.; Stühn, B.; Mulhaupt, R.; Frey, H. *Adv. Mater.* 1996, 8, 414; Ponomarenko, S. A. Boiko, N. I.; Shibaev, V. P.; Richardson, R. M.; Whitehouse, I. J.; Rebrov, E. A.; Muzafarov, A. M. *Macromolecules* 2000, 33, 5549; Saez, I. M.; Goodby, J. W.; Richardson, R. M. *Chem. Eur. J.* 2001, 7, 2758]; and Macrocarbocycles with mesogenic segments as part of the ring structure [cf. Percec, V.; Kawasumi, M.; Rinaldi, P. L.; Litman, V. E. *Macromolecules* 1992, 25, 3851].

A series of recent papers reported a new molecular design concept, in which nematic and chiral groups are chemically bonded to a volume-excluding core to prevent crystallization upon cooling [cf. Shi, H.; Chen, S. H. *Liq. Cryst.* 1994, 17, 413, *Liq. Cryst.* 1995, 18, 733, *Liq. Cryst.* 1995, 19, 785, and *Liq. Cryst.* 1995, 19, 849; Mastrangelo, J. C., Blanton, T. N.; Chen, S. H., *Appl. Phys. Lett.* 1995, 66, 2212; Chen, S. H.; Mastrangelo, J. C.; Shi, H.; Bashir-Hashemi, A.; Li, J.; Gelber, N., *Macromolecules* 1995, 28, 7775; De Rosa, M. E.; Adams, W. W.; Bunning, T. J.; Shi, H.; Chen, S. H. *Macromolecules* 1996, 29, 5650; Chen, S. H., Mastrangelo, J. C.; Blanton, T. N.; Bashir-Hashemi, A. *Liq. Cryst.* 1996, 21, 683; Chen, S. H.; Shi, H.; Conger, B. M.; Mastrangelo, J. C.; Tsutsui, T. *Adv. Mater.* 1996, 8, 998; Chen, S. H.; Mastrangelo, J. C.; Blanton, T. N.; Bashir-Hashemi, A. *Macromolecules* 1997, 30, 93; Chen, S. H.; Katsis, D.; Mastrangelo, J. C.; Schmid, A. W.; Tsutsui, T.; Blanton, T. N. *Nature* 1999, 397, 506].

As a result, the long-range order characteristic of liquid crystal fluids are preserved in glassy state with superior stability against thermally activated recrystallization. Glassy nematics with the highest phase transition temperatures and the broadest mesomorphic fluid temperature range ever reported have been achieved [cf. Fan, F. Y.; Culligan, S. W.; Mastrangelo, J. C.; Katsis, D.; Chen, S. H.; Blanton, T. N. *Chem. Mater.* 2001, 13, 4584; Fan, F. Y.; Mastrangelo, J. C.; Katsis, D.; Chen, S. H.; Blanton, T. N. *Liq. Cryst.* 2000, 27, 1239].

Of all the GLCs, chiral nematics are of particular interest because of the potential for use as large area nonabsorbing polarizers [cf. Katsis, D.; Chen, H. P.; Mastrangelo, J. C.; Chen, S. H.; Blanton, T. N. *Chem. Mater.* 1999, 11, 1590], optical notch filters and reflectors [cf. Chen, H. P.; Katsis, D.; Mastrangelo, J. C.; Chen, S. H.; Jacobs, S. D.; Hood, P. J. *Adv. Mater.* 2000, 12, 1283], and polarized fluorescent films [cf. Chen, S. H.; Katsis, D.; Mastrangelo, J. C.; Schmid, A. W.; Tsutsui, T.; Blanton, T. N. *Nature* 1999, 397, 506]. This class of materials has been synthesized by a statistical approach [cf. Chen, S. H.; Mastrangelo, J. C.; Blanton, T. N.; Bashir-Hashemi, A. *Liq. Cryst.* 1996, 21, 683; Katsis, D.; Chen, H. P.; Mastrangelo, J. C.; Chen, S. H.; Blanton, T. N. *Chem. Mater.* 1999, 11, 1590], which requires intensive work-up procedures to arrive at pure components, and by a deterministic approach via 2,4-dioxo-3-oxa-bicyclo [3.3.1]nonane-7-carboxylic acid chloride as an unstable intermediate prepared under demanding conditions [cf. Shi, H.; Chen, S. H. *Liq. Cryst.* 1995, 19, 849; Chen, H. P.; Katsis, D.; Mastrangelo, J. C.; Chen, S. H.; Jacobs, S. D.; Hood, P. J. *Adv. Mater.* 2000, 12, 1283].

SUMMARY OF THE INVENTION

The present invention is directed to a glassy chiral-nematic liquid crystal composition that comprises a compound having the structural formula

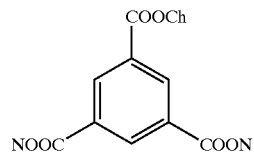

wherein each N represents a nematic group connected to the 1, 3, 5-benzenetricarbonyl central moiety by a carboxylic ester linkage and Ch represents a chiral group connected to the central moiety by a carboxylic ester linkage. The invention is further directed to an optical device formed from at least one of the glassy chiral-nematic liquid crystal compositions.

DETAILED DESCRIPTION OF THE INVENTION

Glassy chiral-nematic liquid crystal compositions of the present invention comprise compounds that include two nematic groups and one chiral group chemically bonded connected by carboxylic ester moieties to a benzene core. Shown below are lists of exemplary nematic N and chiral Ch groups suitable for inclusion in the liquid crystal compounds of the present invention:

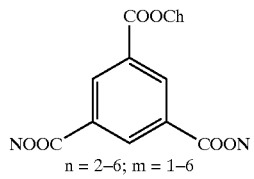
n = 2–6; m = 1–6

Ch =

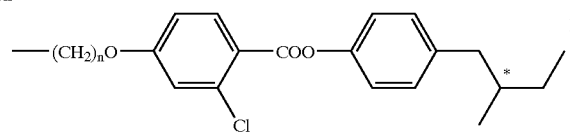

N = 

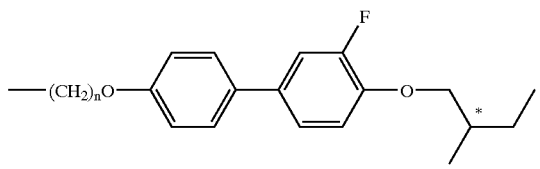

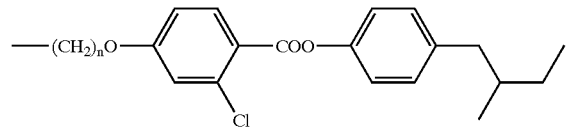

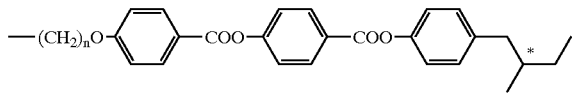

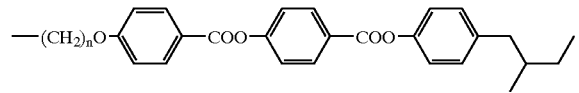

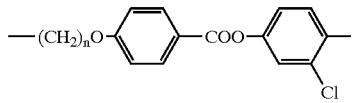

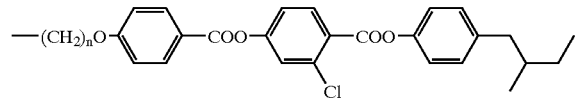

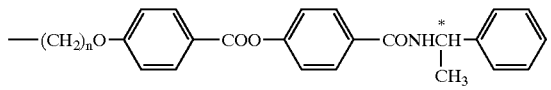

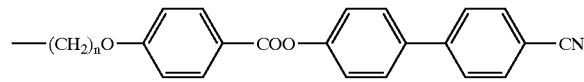

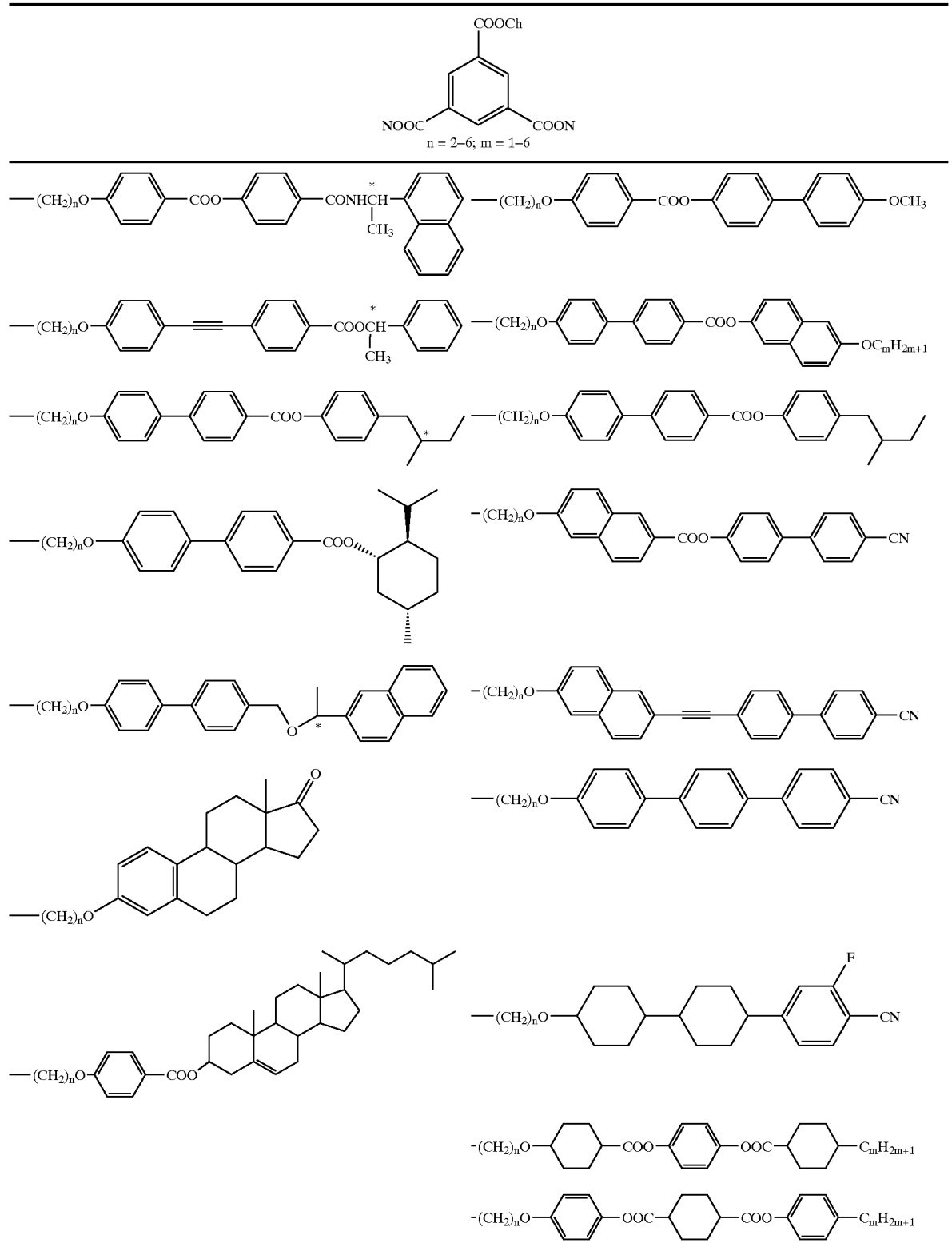

Useful nematogenic substituent groups include compounds containing biphenyl or terphenyl moieties, for example, 4-(1-propylene-3-oxy)-benzoic acid 4'-cyanobiphenyl-4-yl ester and 3-(4'-cyano-p-terphenyloxy)-1-propyl groups. Suitable chiral groups include esters or ethers of chiral alcohols or amides of chiral amines, for example, (S)— and (R)-1 (phenylethyl) amide moieties and (+)-estrone ether or ester moieties.

The liquid crystal compositions of the present invention are characterized by elevated $T_g$ and clearing temperature, $T_c$ and are useful for the formation of a variety of optical devices. Selective reflection wavelength can be tuned across the visible to the infrared region by mixing a pair of enantiomeric chiral nematics at varying ratios for the fabrication of high-performance circular polarizers, optical notch filters, and reflectors. Alternatively, tunability can be accomplished by mixing a chiral nematic liquid crystalline compound with a nematic liquid crystalline compound at varying ratios.

Figure 1:
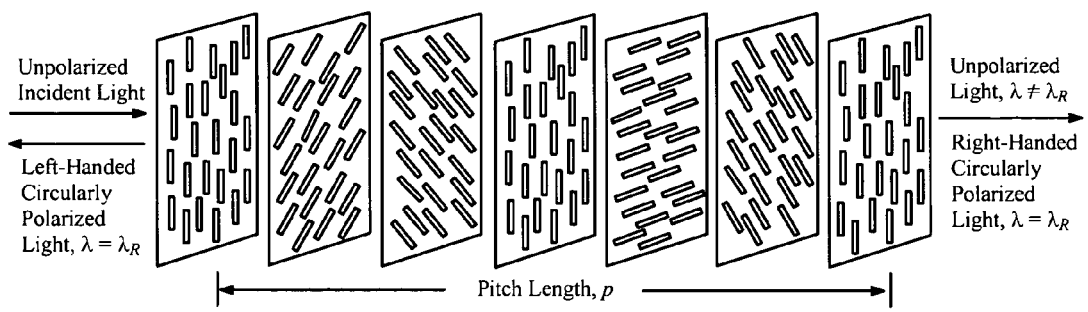
FIG. 1 is a schematic diagram of selective reflection and circular polarization of unpolarized light at normal incidence on a left-handed chiral-nematic liquid crystalline film.

The supramolecular structure of a chiral-nematic liquid crystal film is well documented [cf. Dreher, R.; Meier, G. Phys. Rev. A, 1973, 8, 1616]. Consisting of a helical stack of quasinematic layers, it is characterized by handedness and helical pitch length, p, as depicted in FIG. 1. Handedness describes the direction in which twisting of the nematic director occurs from one layer to the next, and p is defined as the distance over which the director rotates by 360°. The property of selective reflection can be described in terms of $\lambda_R = p(n_e + n_o)/2$, in which $n_e$ and $n_o$ are the extraordinary and ordinary refractive indices of the quasinematic layer, respectively. In FIG. 1 is schematically illustrated incident unpolarized white light propagating through a left-handed film. Unpolarized light consists of equal amounts of left- and right-handed (LH and RH) circularly polarized component. The LH circularly polarized component in the neighborhood of $\lambda_R$ is selectively reflected, while the RH component is completely transmitted. A sufficiently thick, single-handed cholesteric film is capable of reflecting 50% of incident unpolarized light within the selective reflection band. Outside the selective reflection band, incident light is transmitted regardless of its polarization state. It follows that a stack of RH and LH chiral-nematic films tuned at the same $\lambda_R$ will reflect 100% of incident unpolarized light within the selective reflection band without attenuating the rest of the spectrum.

Use of enantiomeric 1-phenylethylamines as precursors for the chiral groups results in helical pitch lengths from about 188 nm to about 210 nm, giving rise to selective reflection in the UV-region. With (+)-estrone as precursor for the chiral moiety, a selective reflection in the near infrared is observed.

In the preparation of the liquid crystal compounds of the present invention, all chemicals, reagents, and solvents were used as received from the Sigma-Aldrich Chemical Company or VWR Scientific, with the exception that tetrahydrofuran (99%) was dried by distillation over sodium in the presence of benzophenone. Silica gel 60 (EM Science, 230–400 mesh) was used for liquid chromatography. Purity of intermediates was monitored by thin-layer chromatography and $^1$H NMR spectroscopy.

SCHEME 1 following illustrates the preparation of several nematic and chiral intermediates suitable for the practice of the present invention:

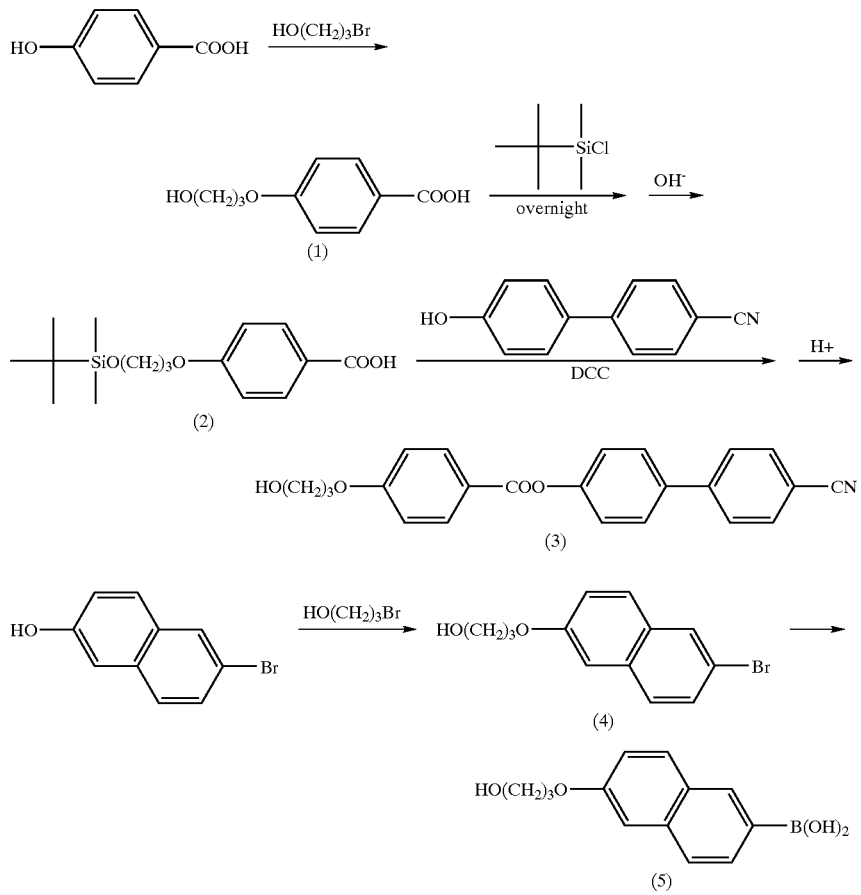

-continued
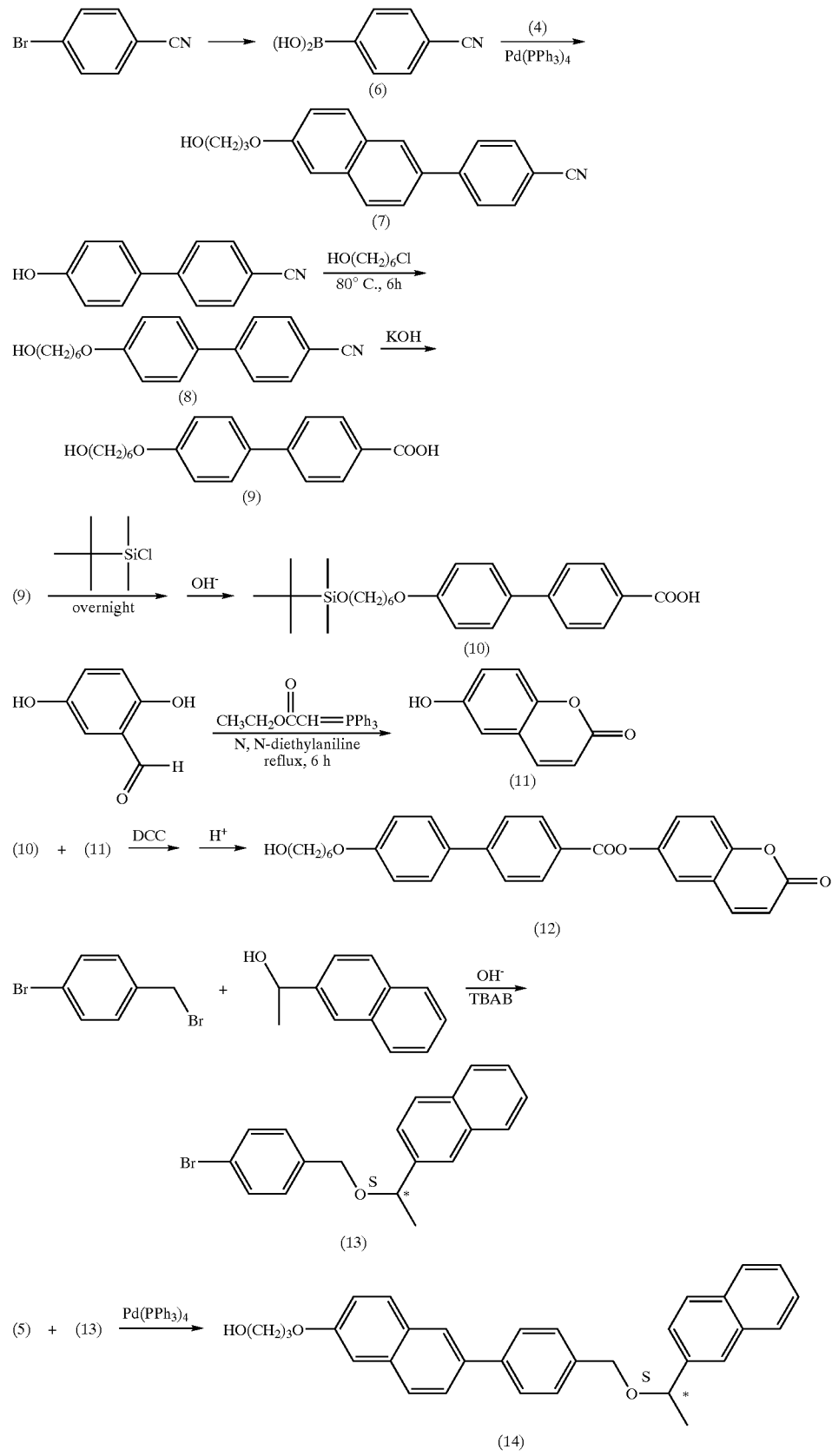

The intermediates depicted in SCHEME 1 above were synthesized by the following procedures:

4-(3-Hydroxy-propoxy)benzoic acid (1)

To a solution of 4-hydroxybenzoic acid (25.0 g, 0.18 mol), potassium hydroxide (27.6 g, 0.49 mol), and potassium iodide (3.0 g, 0.018 mol) in ethanol (75 mL) and water (5 mL) was added dropwise 3-bromopropanol (25.6 g, 0.19 mol). The reaction was allowed to continue for 24 h under reflux. The solid residue was filtered off, and the filtrate was evaporated to dryness. The resultant solid was dissolved in water (200 mL) and then acidified with a 10% HCl solution. The precipitate was filtered for recrystallization from ethanol: water (1:1) to yield 1(26.7 g, 75%). $^1$H NMR (200 MHz, DMSO-$d_6$): δ 1.85 (quintet, 2H, —$CH_2$—), δ 3.55 (t, 2H, —$CH_2$OAr), δ 4.10 (t, 2H, HOC$H_2$—), δ 6.95 (d, 2H, aromatic ring), δ 7.85 (d, 2H, aromatic ring).

4-[3-[(tert-Butyldimethylsilyl)oxy]propoxy]benzoic acid (2)

To a solution of 1 (10.0 g, 0.05 mmol) and tert-butyldimethylsilyl chloride (17.50 g, 0.11 mmol 1) in anhydrous N,N-dimethylformamide (45 mL) was quickly added imidazole (14.16 g, 0.21 mmol) under argon. After stirring overnight, the reaction mixture was shaken with diethyl ether (100 mL) and water (300 mL). The ether layer was separated and washed with a saturated NaHCO$_3$ solution (100 mL×2) before drying over anhydrous MgSO$_4$. The solvent was evaporated, and the solid residue was purified by flash column chromatography on silica gel with methylene chloride: hexanes (1:1) as the eluent to afford 2 with silyl-protected hydroxyl and carboxyl groups. This compound was dissolved in tetrahydrofuran: methanol (50 mL: 150 mL) followed by stirring with a solution of K$_2$CO$_3$ (5 g, 36.18 mmol) in water (50 mL) for 1 h. The volume of the solution was reduced by 75% via evaporation under reduced pressure. Brine (150 mL; 120 g NaCl in 500 mL H$_2$O) was added to the resultant slurry, and the pH was adjusted to 5.0 with a 1 M KHSO$_4$ solution. The precipitate was collected by filtration and washed with water before drying under vacuum at 60° C. to yield 2 (13.7 g, 87%). $^1$H NMR (200 MHz, CDCl$_3$): δ 0.06 (s, 6H, —S$_1$—CH$_3$), δ 0.91 (s, 9H,-SiCCH$_3$)δ 2.01 (quintet, 2H, —CH$_2$—), δ 3.81 (t, 2H, —CH$_2$OAr), δ 4.16 (t, 2 H, HOCH$_2$—), δ 6.96 (d, 2H, aromatic ring), δ 8.06 (d, 2H, aromatic ring).

4-(3-Hydroxy-propoxy)-benzoic acid 4'-cyanobiphenyl-4-yl ester (3)

To a solution of 2 (10 g, 32.21 mmol), 4'-hydroxybiphenyl-4-carbonitrile (6.35 g, 32.53 mmol), and toluenesulfonic/4-(dimethylamino)pyridine complex (0.95 g, 3.22 mmol) in anhydrous methylene chloride (100 mL) was added N,N-dicyclohexylcarbodiimide (6.98 g, 33.82 mmol) under argon. The reaction mixture was stirred at 40° C. overnight. Upon filtering off the white residues, the filtrate was diluted with additional methylene chloride. The solution was then washed with water. The silyl ether of the title compound was purified by flash column chromatography on silica gel with gradient elution from 0 to 2% acetone in methylene chloride. The silyl-protected compound was hydrolyzed in tetrahydrofuran: water:acetic acid (80 mL: 80 mL: 240 mL) overnight. The volume of the solution was reduced by 50% via evaporation under reduced pressure. Methylene chloride was added to the slurry for washing sequentially with H$_2$O, a 10% NaHCO$_3$ solution and brine before drying over anhydrous MgSO$_4$. The crude product resulting from evaporation of the solvent was purified by recrystallization from ethanol to yield 3 (10.71 g, 89%). $^1$H NMR spectral data (400 MHz, CDCl$_3$): δ 2.10 (quintet, 2H, —CH$_2$—), δ 3.95 (t, 2H, —CH$_2$OAr), δ 4.25 (t, 2H, HOCH$_2$—), δ 7.00–8.25 (m, 12H, aromatic rings).

4-Cyanophenyl boronic acid (6)

This compound was prepared following the procedures reported by Hird et al. [Hird, M.; Toyne,; K. J.; Gray, G. W.; Day, S. E.; McDonnell, D. G.; Liquid Crystals, 1993, vol. 15, p 123.

6-Bromo-2-(3-hydroxypropyl)-naphthalene (4)

This compound was reported in Liquid Crystals 1996, vol. 21, pp 683–694.

6-(3-Hydroxypropyloxy)-2-naphthaleneboronic acid (5)

To a solution of 4 (25.00 g, 89.3 mmol) in anhydrous tetrahydrofuran (500 mL) was added n-butyllithium (80.2 ml, 2.5M in hexane, 196.4 mmol) dropwise at −78° C. The reaction mixture was kept at this temperature for 1 h before adding a tri(isopropyl)borate solution (50.38 g, 267.9 mmol in 60 mL anhydrous tetrahydrofuran). The reaction was continued overnight while the temperature was allowed to rise to the ambient. The reaction mixture was cooled in an ice bath before adding 10% HCl (500 ml). After stirring for 1 h, a large amount of water was added to the reaction mixture for extraction with ether. Combined ethereal extraction was dried over anhydrous MgSO$_4$. The crude product resulting from evaporation of the solvent was purified by recrystallization from ethanol/water (10:1) to yield 5 (16.85 g, 76.7%). $^1$H NMR spectral data (400 MHz, Acetone-$d_6$): δ 2.0 (m, 2H, —CH$_2$—), δ 3.79 (m, 2H, —CH$_2$OAr), δ 4.25 (m, 2H, HOCH$_2$—), δ 7.00–8.5 (m, 6H, aromatic rings) (The spectrum was complicated due to strong hydrogen bonding).

4-Cyanophenylboronic acid (6)

This compound was prepared by the procedure described in Hird et al., Liquid Crystals, 1993 col. 15, p. 123.

2-(3-Hydroxypropyl)-6-(4-cyanophenyl)-naphthalene (7)

This compound was reported in Liquid Crystals 1996, vol. 21, pp 683–694.

4-(6-Hydroxyhexyloxy)-4'-cyanobiphenyl (8)

4-Hydroxy-4'-cyanobiphenyl (10.35 g, 53.0 mmol), 6-chloro-1-hexanol (9.05 g, 66.3 mmol), cesium carbonate (18.99 g, 58.3 mmol), and potassium iodide (0.88 g, 5.3 mmol) were dissolved in N,N-dimethylformamide (DMF, 130 mL). The reaction mixture was stirred at 80° C. for 6 h. The resultant salt was removed by hot filtration. The filtrate was slowly added to 600 mL water, and the crude product was collected for recrystallization from methanol to yield 8 (14.24 g, 91.0%). $^1$H NMR spectral data (400 MHz, CDCl$_3$): δ 1.40-1.70 (m, 6H, CH$_2$—), δ 1.87 (m, 2H, —CH$_2$—), δ 3.69 (t, 2H, —CH$_2$OAr), δ 4.03 (t, 2H, HOCH$_2$—), δ 6.80–7.90 (m, 8H, aromatic rings).

4'-(6-Hydroxyhexyloxy)-4-biphenylcarboxylic acid (9)

To a solution of 8 (13.0 g, 4.4 mmol) in ethylene glycol (370 ml) was added KOH (37.07 g, 66.06 mmol). After refluxing for 2 h, the reaction mixture was poured into 1.6 L water for acidification to a pH less than 4. The precipitate from acidification was boiled in methanol to remove water and ethylene glycol. The solid residue collected by filtration was further purified by boiling in methylene chloride. The solid product was further washed with hot methylene chloride to yield 9 (12.94 g, 93.4%). $^1$H NMR spectral data (400 MHz, DMSO-d$_6$): δ 1.30-1.50 (m, 6H, —CH$_2$—), 1.74 (m, 2H, —CH$_2$—), δ 3.40 (t, 2H, —CH$_2$OAr), δ 4.01 (t, 2H, HOCH$_2$—), δ 7.05 (d, 2H, aromatic rings), δ 7.67 (d, 2 H, aromatic rings), δ 7.74 (d, 2H, aromatic rings), δ 7.98 (d, 2H, aromatic rings).

4'-(6-((tert-Butyldimethylsilyl)oxy)hexyloxy)-4-biphenylcarboxylic acid (10)

To a solution of 9 (12.0 g, 38.22 mmol) and tert-butyldimethylsilyl chloride (13.07 g, 86.68 mmol) in anhydrous N,N-dimethylformamide (80 mL) was quickly added imidazole (10.62 g, 155.96 mmol). After stirring under argon overnight, the reaction mixture was shaken with diethyl ether (100 mL) and water (300 mL). The ethereal layer was separated and washed with a saturated NaHCO$_3$ solution before drying over anhydrous MgSO$_4$. The crude product resulting from evaporation of the solvent was purified by flash column chromatography on silica gel with methylene chloride: hexanes (1:1) as the eluent to afford a compound with silyl-protected hydroxyl and carboxyl groups. The compound was dissolved in tetrahydrofuran:methanol (120 mL:60 mL) followed by stirring with a solution of 10% K$_2$CO$_3$ aqueous solution (60 mL) for 1 h. The volume of the solution was reduced to 25% via evaporation under reduced pressure. Brine (250 ml; 120 g NaCl in 500 mL H$_2$O) was added to the slurry, and the pH was adjusted to 5.0 with 1 M aqueous solution of potassium hydrogen sulfate, KHSO$_4$. The precipitate was collected by filtration and washed with water followed by drying under vacuum at 70° C. to yield 10 (16.3 g, 99%). $^1$H NMR spectral data (400 MHz, Acetone-d$_6$): δ 0.03 (s, 6H, —Si(CH$_3$)$_2$), δ 0.86 (s, 9H, —SiCCH$_3$), δ 1.30–1.60 (m, 6H, —CH$_2$—), δ 1.74 (m, 2H, —CH$_2$—), δ 3.59 (t, 2H, —CH$_2$OAr), δ 4.01 (t, 2H, SiOCH$_2$—), δ7.03 (d, 2H, aromatic rings), δ 7.66 (d, 2H, aromatic rings), δ 7.70 (d, 2H, aromatic rings), δ 7.97 (d, 2H, aromatic rings).

6-Hydroxycoumarin (11)

This compound was prepared following the published procedure in Helvetica Chimica Acta 2002, vol. 85, pp 442-450.

4'-(6-Hydroxyhexyloxy)-[1,1'-biphenyl]-4-carboxylate acid, 4-(6-coumarin) ester (12)

To a solution of 10 (15.00 g, 34.99 mmol), 11 (5.67 g, 34.99 mmol), and p-toluenesulfonic/4-(dimethylamino)pyridine complex (1.03 g, 3.50 mmol) in a mixture of anhydrous methylene chloride (100 mL) and anhydrous tetrahydrofuran (200 mL) was added N, N-dicyclohexylcarbodiimide (7.58 g, 36.74 mmol). The reaction mixture was stirred at 40° C. under argon overnight. Upon filtering off white residues, the filtrate was diluted with additional methylene chloride. The solution was then washed with water. The silyl ether of the title compound was purified by flash column chromatography on silica gel with gradient elution from 0 to 2% acetone in methylene chloride. The silyl-protected compound was hydrolyzed in tetrahydrofuran:water:acetic acid (80 mL:80 mL:240 mL) overnight. The volume of the solution was reduced by 50% via evaporation under reduced pressure. Methylene chloride was added to the slurry for washing sequentially with H$_2$O, a 10% NaHCO$_3$ solution and brine (120 g NaCl in 500 mL H$_2$O) before drying over anhydrous MgSO$_4$. The crude product resulting from evaporating off the solvent was purified by recrystallization from ethanol to yield 12 (3.57 g, 22%). $^1$H NMR spectral data (400 MHz, CDCl$_3$): δ 1.40-1.70 (m, 6H, —CH$_2$—), δ 1.87 (m, 2H, —CH$_2$—), 3.69 (t, 2H, —CH$_2$OAr), δ 4.03 (t, 2H, HOCH$_2$—), δ 6.51 (d, 1H, CH=CHCO coumarin rings), δ 7.00 (d, 2H, biphenyl), δ 7.43 (s, 3H, coumarin aromatic rings), δ 7.62 (d, 2H, biphenyl), 7.70-7.80 (m, 3H, biphenyl and CH=CHCO coumarin rings), δ 8.25 (d, 2H, biphenyl).

(S)-2-[1-(4'-bromophenylmethoxy)ethyl]naphthalene (13)

To a solution of (S)-(-) methyl-2-naphthalenemethanol (15 g, 60.0 mmol), tetrabutyl ammonium bromide (TBAB, 0.97 g, 3.0 mmol) in a mixture of hexane (150 ml) and 50% NaOH (40 ml) was added 4-bromobenzyl bromide (11.37 g, 66.0 mmol). The reaction was carried out at 80° C. for 1.5 h. After cooling to room temperature, the reaction mixture was extracted with methylene chloride and water. The combined methylene chloride extracts were further washed with H$_2$O and brine (120 g NaCl in 500 mL H$_2$O) before drying over anhydrous MgSO$_4$. The crude product resulting from evaporation of the solvent was purified by short-path flash column chromatography on silica gel with a gradient elution from 2 to 5% ethyl acetate in hexane to yield 13 (15.18 g, 74.4%). $^1$H NMR spectral data (400 MHz, CDCl$_3$): δ 1.61 (d, 2H, —CH$_3$), δ 4.20–4.50 (dd, 2H, —CH$_2$Ar), δ 4.68 (q, 1H, —CH(CH$_3$)-), δ 7.10-8.00 (m, 11H, aromatic rings) (S)-2'4-[1-(2-naphthyl)ethoxymethyl]phenyl-6'-(3-hydroxypropyl)-naphthalene (14) To a mixture of 13 (14.0 g, 41.2 mmol) and tetrakis(triphenylphosphine) palladium(0) (1.19 g, 1.03 mmol) in benzene (105 ml, argon purged) were added 5 (11.14 g, 45.3 mmol) in ethanol (25 ml, argon purged), and 2M Na$_2$CO$_3$ aqueous solution (90 ml, argon purged) in sequence under argon. The reaction was refluxed under argon for 12 h. Upon cooling to ambient temperature, the reaction mixture was extracted with methylene chloride and water. The organic layer was dried over anhydrous MgSO$_4$ before evaporation to dryness. The crude product was purified by column chromatography on silica gel with gradient elution from 1.5 to 4% acetone in methylene chloride to yield 14 (12.03 g, 63.2%). $^1$H NMR spectral data (400 MHz, CDCl$_3$): δ 1.62 (d, 3H, —CH$_3$), δ 2.10 (quintet, 2H, —CH$_2$—), δ 3.95 (t, 2H, CH$_2$OAr), δ 4.25 (t, 2H, HOCH$_2$—), δ 4.38-4.58 (m, 2H, —CH$_2$Ar), δ 4.74 (q, 1H, —CH(CH$_3$)—), δ 7.00-8.25 (m, 17H, aromatic rings).

3-(2-Hydroxy-propoxy)-estra-1,3,5 (10)-trien-17-one

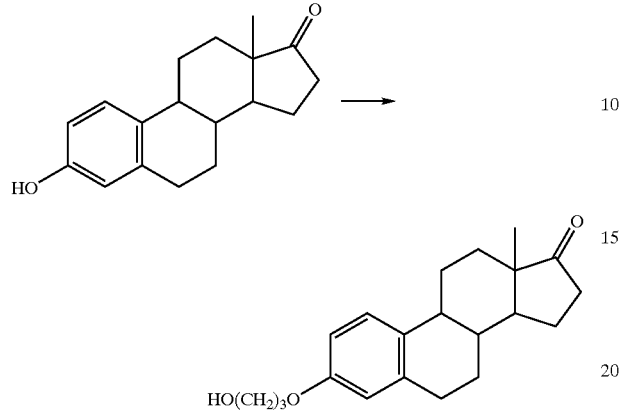

A solution of 3-bromo-1-propanol (0.400 ml, 4.42 mmol), (+)-estrone (1.00 g, 3.70 mmol), sodium hydroxide (150 mg, 3.75 mmol) and potassium iodide (100 mg, 0.602 mmol) in 10 ml methanol and 10 ml water was refluxed overnight. The reaction mixture was shaken with 100 ml methylene chloride and 100 ml water. The organic layer was washed with a 10% NaHCO$_3$ solution (100 ml×2) and water (100 ml×2) before drying over anhydrous Na$_2$SO$_4$. Further purification was performed by silica gel column chromatography with methylene chloride: acetone (50:1) as the eluent to yield 3-(2-hydroxy-propoxy)-estra-1,3,5(10)-trien-17-one (800 mg, 66%). $^1$H NMR spectral data, δ(CDCl$_3$): 0.93–2.94 (m, 23H on estrone), 3.88 (2H, —CH$_2$OH), 4.13 (t, 2H, estrone-OCH$_2$—), 6.68–7.23 (m, 3H, aromatics).

SCHEME 2 following illustrates the preparation of several exemplary chiral-nematic liquid crystalline compounds prepared in accordance with the present invention:

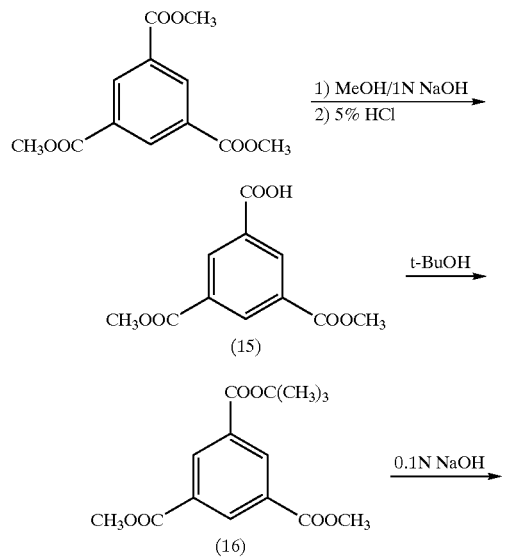

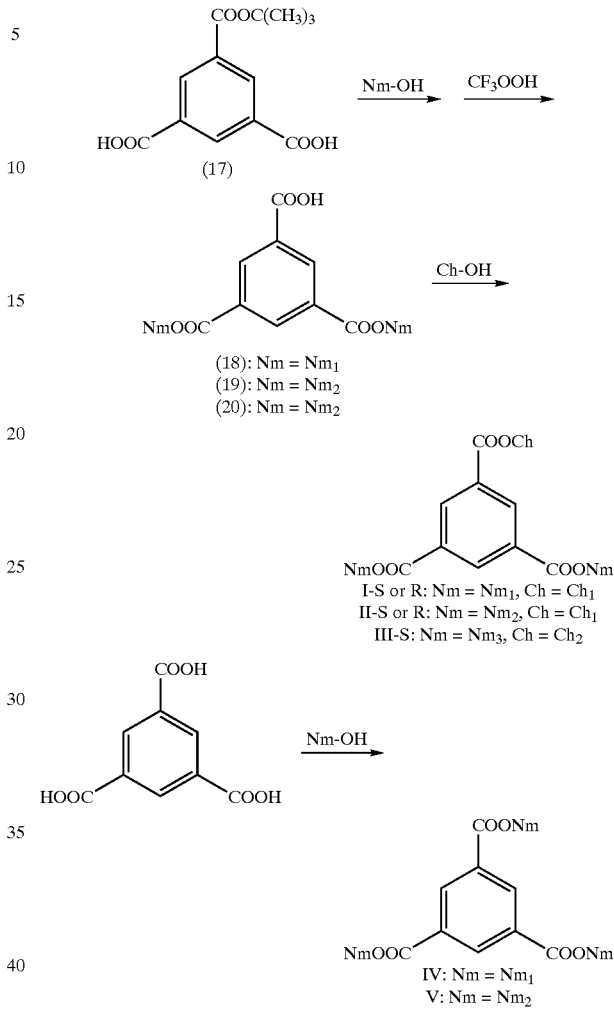

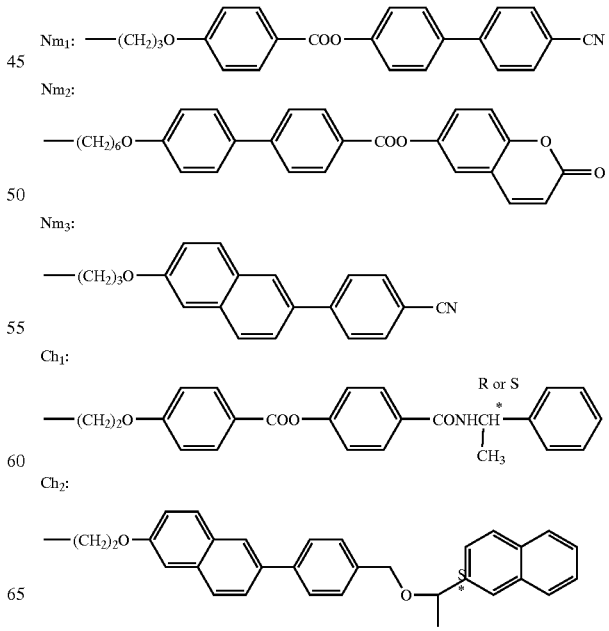

The compounds depicted in SCHEME 2 above were synthesized by the following procedures:

1.3.5-Benzene-tricarboxylic acid, dimethyl ester (15)

This compound was prepared in a 65% yield via monohydrolysis of trimethyl 1,3,5 benzene-tricarboxylate following the procedure described in M. Engel, C. B. Burris, C. A. Slate, and B. W. Erickson, *Tetrahedron* 1993, vol. 49, p 8761.

1,3,5-Benzenetricarboxylic acid, 1-t-butyl ester-3,5-dimethyl ester (16)

A solution of 15 (3.00 g, 12.59 mmol) and 1,1-carbonyldiimidazole (2.08 g, 12.59 mmol) in anhydrous N,N-dimethylformamide (18 mL) was stirred at 50° C. for 1 h before adding anhydrous t-butyl alcohol (1.87 g, 25.19 mmol) and 1,8-diazabicyclo[5,4,0]undec-7-ene (DBU) (1.92 g, 12.59 mmol) under argon. Reaction was allowed to continue at 60° C. for 48 h. Upon adding $H_2O$ (120 mL), the reaction mixture was acidified to pH 4 with a 2.5% HCl solution for extraction with methylene chloride. The combined methylene chloride extracts were washed with $H_2O$ and brine (120 g NaCl in 500 mL $H_2O$) before drying over anhydrous $MgSO_4$. The crude product resulting from evaporation of the solvent was purified by flash column chromatography on silica gel with a gradient elution from 0 to 2% acetone in methylene chloride to yield 16 (3.25 g, 88%). $^1$H NMR (400 MHz, $CDCl_3$): δ 1.65 (s, 9H, $(CH_3)_3C$—), δ 4.0 (s, 6H, $CH_3OOC$—), δ 8.78-8.90 (m, 3H, Ar).

1,3,5-Benzenetricarboxylic acid, 1-t-butyl ester (17)

To a solution of 16 (1.00 g, 3.40 mmol) in tetrahydrofuran (30 mL) was added a 0.1 N solution of NaOH (30 mL). A 1 N NaOH solution was added as needed to keep pH at 11.5 in the course of the reaction. The reaction was continued until both methyl esters were hydrolyzed as detected by TLC. The pH was then adjusted to 7 by adding a 5% HCl solution, and the volume was reduced by 50% via evaporation under reduced pressure. Upon adding water (20 mL) and acidification to a pH between 4 and 5 with a 10% HCl solution, a precipitate formed that was collected by filtration and further washed with water to yield 17 (0.80 g, 88%). $^1$H NMR (400 MHz, DMSO-$d_6$): δ 1.59 (s, 9H, $(CH_3)_3C$—), δ 8.5–8.7 (m, 3H, Ar).

1,3,5-Benzenetricarboxylic acid, 1,3-bis-{3-[4-(4'cyano-biphenyl-4-yloxycarbonyl)-phenoxy]-propyl ester} (18)

To a solution of 17 (0.30 g, 1.10 mmol), 4-(3-hydroxy-propoxy)-benzoic acid 4'-cyanobipenyl-4-yl ester (0.82 g, 2.20 mmol), and triphenylphosphine (0.63 g, 2.42 mmol) in anhydrous tetrahydrofuran (12 mL) was added dropwise diethyl azodicarboxylate (0.46 g, 2.64 mmol) under argon. The reaction was continued at room temperature overnight. The solvent was then evaporated off under reduced pressure, and the solid residue was dissolved in methylene chloride for purification by flash column chromatography on silica gel with a gradient elution from 0 to 4% acetone in methylene chloride. The hydrolysis of t-butyl ester was accomplished using trifluoroacetic acid (20 mL) in methylene chloride (20 mL). After addition of methylene chloride (15 mL), the reaction mixture was washed sequentially with $H_2O$ and brine (120 g NaCl in 500 mL $H_2O$) before drying over anhydrous $MgSO_4$. The crude product resulting from evaporation off the solvent was purified by flash column chromatography with a solvent gradient ranging from 1 to 6% acetone in methylene chloride. Precipitation from a methylene chloride solution into cold methanol resulted in a solid product, 18 (0.70 g, 68%). $^1$H NMR (400 MHz, DMSO-$d_6$): δ 2.27 (m, 4H, —$CH_2$—), δ 4.28 (t, 4H, —$CH_2OAr$), δ 4.54 (t, 4H, $COOCH_2$—), δ 7.00–8.80 (m, 27H, aromatics).

1,3,5-Benzenetricarboxylic acid, 1,3-bis-{3-[4-(4-cyano-biphenyl-4-yloxycarbonyl)-phenoxy]-propyl-ester{, 5-}8-4-[[4-[(S)-(–)-1-(phenylethyl)benzamide]-1-oxy]benzoate-1-oxy]ethyl ester} (I-S)

To a solution of 18 (0.30 g, 0.33 mmol), (S)-(–)-1-(phenylethyl)-4-[[4-(2-hydroxyethoxy)benzoyl]oxy]benzamide (0.13 g, 0.33 mmol), and triphenylphosphine (0.094 g, 0.36 mmol) in anhydrous tetrahydrofuran (4 mL) was slowly added diethyl azodicarboxylate (0.068 g, 0.39 mmol) under argon. The reaction was continued at room temperature overnight. The solvent was evaporated off under reduced pressure, and the solid residue was dissolved in methylene chloride for purification by flash column chromatography on silica gel with a gradient elution from 0 to 4% acetone in methylene chloride. The solid product was collected by precipitation from a methylene chloride solution into methanol to yield I-S (0.27 g, 64%). Anal. Calcd. for $C_{79}H_{61}N_3O_{16}$: C 72.52%, H 4.70%, N 3.21%. Found: C 72.05%; H 4.44%, N 3.18%. $^1$H NMR (400 MHz, $CDCl_3$): δ 1.63 (d, 3H, —$CH_3$ from chiral pendant), δ 2.37 (q, 4H, —$CH_2$— pendants), δ 4.25 (t, 4H, —$OCH_2$— from nematic pendants), δ 4.58 (t, 2H, —$OCH_2$— from chiral pendants), δ 4.64 (t, 4H, —$COOCH_2$— from nematic pendants), δ 4.81 (t, 2H, —$COOCH_2$— from chiral pendants), δ 5.36 (m, 1H, —CH from chiral pendant), δ 6.34 (d, 1H, —NH), δ 6.85–9.00 (m, 40H, aromatics).

1,3,5-Benzenetricarboxylic acid, 1,3-bis-L3-[4-(4 cyano-biphenyl-4-yloxycarbonyl)-phenoxy]-propyl ester}, 5-{[4-[[4-[(R)-(+)-1-(phenylethyl)]benzamide]-1-oxy]benzoate-1-oxy] ethyl ester{ (I-R)

The procedure for the synthesis of I-S was followed for I-R (0.24 g, 67%) by using (R)-(+)-1-(phenylethyl)-4-[[4-(2-hydroxyethoxy)-benzoyl]oxy]-benzamide (0.11 g, 0.28 mmol). Anal, Calcd, for $C_{79}H_{61}N_3O_{16}$: C 72.52%, H 4.70%, N 3.21%. Found: C 72.05%; H 4.51%, N 3.23%. $^1$H NMR (400 MHz, $CDCl_3$): δ 1.63 (d, 3H, —$CH_3$ from chiral pendant), δ 2.37 (q, 4H, —$CH_2$— pendants), δ 4.25 (t, 4H, —$OCH_2$— from nematic pendants), δ 4.58 (t, 2H, —$OCH_2$— from chiral pendants), δ 4.64 (t, 4H, —$COOCH_2$— from nematic pendants), δ 4.81 (t, 2H, —$COOCH_2$— from chiral pendants), δ 5.36 (m, 11H, —CH from chiral pendant), δ 6.34 (d, 1H, —NH), δ 6.85–9.00 (m, 40H, aromatics).

1,3,5-Benzenetricarboxylic acid, 1,3-bis-{4-[(6-coumarin)-yloxycarbonyl]-4'-biphenoxy] hexyl ester} (19)

The procedure for the synthesis of 18 was followed for 19. $^1$H NMR spectral data (400 MHz, DMF): δ 1.78 (m, 8H, —$CH_2$—), δ 2.05 (m, 8H, —$CH_2$—), δ 4.30 (t, 6H, —$CH_2OAr$), δ 4.63 (t, 6H, $COOCH_2$—), δ 6.77 (d, 2H, CH=CHCO coumarin rings), δ 7.28 (d, 4H, biphenyl), δ 7.70–8.50 (m, 20H, aromatic rings), δ 8.90–9.00 (m, 3H, benzene core).

1,3,5-Benzenetricarboxylic acid. 1,3-bis-{6-(4-cyanophenyl) 2-naphthyloxy]-1-propyl ester} (20)

The procedure for the synthesis of 18 was followed for 20. $^1$H NMR spectral data (400 MHz, Acetone-d$_6$): δ 2.28 (m, 4H, —CH$_2$—), δ 4.26 (t, 4H, —CH$_2$OAr), δ 4.55 (t, 4H, COOCH$_2$—), δ 7.00–8.30 (m, 20H, aromatics from pendants), δ 8.68 (m, 3H, benzene core).

1,3,5-Benzenetricarboxylic acid, 1,3-bis-[4-[(6-coumarin)-yloxycarbonyl]-4'-biphenoxy]hexyl esters{, 5-{[4-[[4-[(S)-(+)-1-(phenylethyl))]benzamide]-1-oxy]benzoate-1-oxy] ethyl ester} (II-S)

The procedure for the synthesis of 1-S was followed for II-S. Anal. Calcd. for C$_{89}$H$_{75}$NO$_{20}$: C 72.30%, H 5.11%, N 0.95%. Found: C 72.24%, H 4.94%, N 1.06%. $^1$H NMR (400 MHz, CDCl$_3$) $^1$H NMR spectral data (400 MHz, CDCl$_3$): 1.61 (d, 3H, —CH$_3$), δ 2.35 (quintet, 2H, —CH$_2$—), δ 4.25 (t, 6H, —CH$_2$OAr), δ 4.38–4.60 (m, 2H, —CH$_2$Ar), δ 4.64 (t, 6H, COOCH$_2$—), δ 4.73 (q, 1H, —CH(CH$_3$)—), δ 7.10–8.00 (d, 37H, aromatic), δ 8.85–8.95 (m, 3H, benzene core).

1,3,5-Benzenetricarboxylic acid, 1,3-bis-([6-[(4'-cyanophenyl) 2-naphthyloxy]-1-propyl ester{, 5-{6-[1-[1-(S)-(2-naphthylethyl)oxo]benzyl]-2-naphthyloxy]-1-propyl ester} (III-S)

The procedure for the synthesis of 1-S was followed for III-S. Anal. Calcd. for C$_{81}$H$_{64}$N2O$_{10}$: C 79.39%, H 5.26%, N 2.29%. Found: C 79.01%, H 5.12%, N 2.27%. $^1$H NMR (400 MHz, CDCl$_3$): δ 1.60 (d, 3H, —CH$_3$), δ 2.35 (quintet, 6H, —CH$_2$—), δ 4.25 (t, 4H, —CH$_2$OAr), δ 4.00–4.60 (dd, 2H, —CH$_2$Ar), δ 4.64 (t, 4H, COOCH$_2$—), δ 4.64 (t, 4 H, COOCH$_2$-), δ 4.74 (q, 1H, —CH(CH$_3$)—), δ 7.00–8.30 (m, 37H, aromatics from pendants), δ 8.90 (s, 3H, benzene core).

1,3,5-Benzenetricarboxylic acid, 1,3,5-tris-{3-[4-(4'cyano-biphenyl-4-yloxycarbonyl)-phenoxy]-propyl ester} (IV)

To a solution of 1,3,5 benzenetricarboxylic acid (0.20 g, 0.95 mmol), 3 (1.07 g, 2.85 mmol), and triphenylphosphine (0.823 g, 3.14 mmol) in anhydrous tetrahydrofuran (12 mL) was slowly added diethyl azodicarboxylate (0.60 g, 3.42 mmol) under argon. The reaction was continued at room temperature overnight. The solvent was evaporated off under reduced pressure, and the solid product was collected by precipitation from a hot chloroform (20 mL) solution into methanol (150 mL) to yield IV (0.76 g, 58%). Anal. Calcd. for C$_{89}$H$_{75}$NO$_{20}$: C 73.40%, H 4.34%, N 3.31%. Found: C 73.27%, H 4.39%, N 3.33%. $^1$H NMR (400 MHz, CDCl$_3$): δ 2.37 (quintet, 6H, —CH$_2$—), δ 4.26 (t, 6H, —CH$_2$OAr), δ 4.65 (t, 6H, COOCH$_2$—), δ 6.90–8.20 (m, 36H, aromatics from pendants), δ 8.83 (s, 3H, benzene core).

1,3,5-Benzenetricarboxylic acid, 1,3,5-tris-{4-[(6-coumarin)-yloxycarbonyl]-4'-biphenoxy] hexyl ester} (V)

To a solution of 1,3,5 benzenetricarboxylic acid (0.15 g, 0.71 mmol), 3 (0.92 g, 2.00 mmol), and triphenylphosphine (0.62 g, 2.36 mmol) in anhydrous tetrahydrofuran (10 mL) was slowly added diethyl azodicarboxylate (0.45 g, 2.57 mmol) under argon. The solvent was evaporated under reduced pressure, and the solid residue was dissolved in methylene chloride for purification by flash column chromatography on silica gel with a gradient elution from 0 to 5% acetone in methylene chloride. The solid product was collected by precipitation from a methylene chloride solution into methanol to yield V (0.73 g, 67%). Anal. Calcd. for C$_{93}$H$_{78}$O$_{21}$: C 72.93%, H 5.13%. Found: C 72.52%, H 5.17%. $^1$H NMR spectral data (400 MHz, CDCl$_3$): δ 1.55 (m, 12H, —CH$_2$—), δ 1.85 (m, 12H, —CH$_2$—), δ 4.00 (t, 6H, —CH$_2$OAr), δ 4.38 (t, 6H, COOCH$_2$—), δ 6.45 (d, 3H, CH=CHCO coumarin rings), δ 6.96 (d, 6H, biphenyl), δ 7.37 (s, 9H, coumarin aromatic rings), δ 7.55 (d, 6H, biphenyl), 7.66 (m, 9H, biphenyl and CH=CHCO coumarin rings), δ 8.19 (d, 6 H, biphenyl), δ 8.83 (s, 3H, benzene core).

Molecular Structures and Thermotropic Properties

Molecular structures are elucidated with $^1$H NMR spectroscopy in CDCl$_3$ (Avance-400,400 MHz; Varian 200, 200 MHz) and elemental analysis (Quantitative Technologies, Inc.). Thermal transition temperatures are determined by differential scanning calorimetry (Perkin-Elmer DSC-7) with a continuous N$_2$ purge at 20 mL/min. Samples are preheated to beyond T$_c$, followed by cooling at −20° C., min down to −30° C., then heating at 20° C./min to beyond T$_c$, thereby furnishing the reported first cooling and second heating scans. Liquid crystalline mesomorphism is characterized with hot-stage polarizing optical microscopy (DMLM, Leica, FP90 central processor and FP82 hot stage, Mettler Toledo).

Preparation and Characterization of Glassy Chiral-Nematic Films Optically flat fused silica substrates (25.4 mm diameter×3 mm thickness, Esco Products; n=1.458 at 589.6 nm) are coated with a nylon (for T$_c$, ≲200° C.) or polyimide alignment (for T$_c$≳200° C.) layer and uniaxially rubbed. Glassy chiral-nematic films, 4-μm thick as defined by glass fiber spacers (Bangs Laboratories), are prepared between two surface-treated substrates buffed in the same direction. Upon melting a powdered sample, the fluid film is thermally annealed at 20° C. below T$_c$, for 30 min before spontaneous cooling to room temperature by turning off the hot stage. Transmittance at normal incidence and reflectance at 6° off normal are measured with unpolarized incident light using a UV-Vis-NIR spectrophotometer (Lambda-900, Perkin-Elmer). Fresnel reflections from the air-glass interfaces are accounted for with a reference cell containing an index-matching fluid (n=1.500 at 589.6 nm) between two surface-treated fused silica substrates. A combination of linear polarizer (HNP'B, Polaroid) and zero-order quarter waveplates (AO1521/4-355, Tower Optical Corp.) is employed to produce left- or right-handed circularly polarized light. Transmittance of circularly polarized light is characterized by UV-Vis-NIR spectrophotometry. A notch filter comprises two single-handed optical elements with opposite handedness, between which an index-matching fluid (n=1.460 at 589.6 nm) is filled. The buffing directions of alignment layers on the two single-handed elements are oriented perpendicular to each other [cf. Chen, H. P.; Katsis, D.; Mastrangelo, J. C.; Chen, S. H.; Jacobs, S. D.; Hood, P. J. Adv. Mater. 2000, 12, 1283]. Two reference cells, referred to above for the characterization of single-handed elements, are stacked together, with an index-matching fluid (n=1.460 at 589.6 nm) between the two, to serve as the reference for the characterization of a notch filter by UV-Vis-NIR spectrophotometry. Cross-sections of glassy chiral-nematic films are sputtered with approximately 100 Å of gold for imaging with scanning electron microscopy (LEO 982 FESEM) to determine the helical pitch length.

Figure 2:
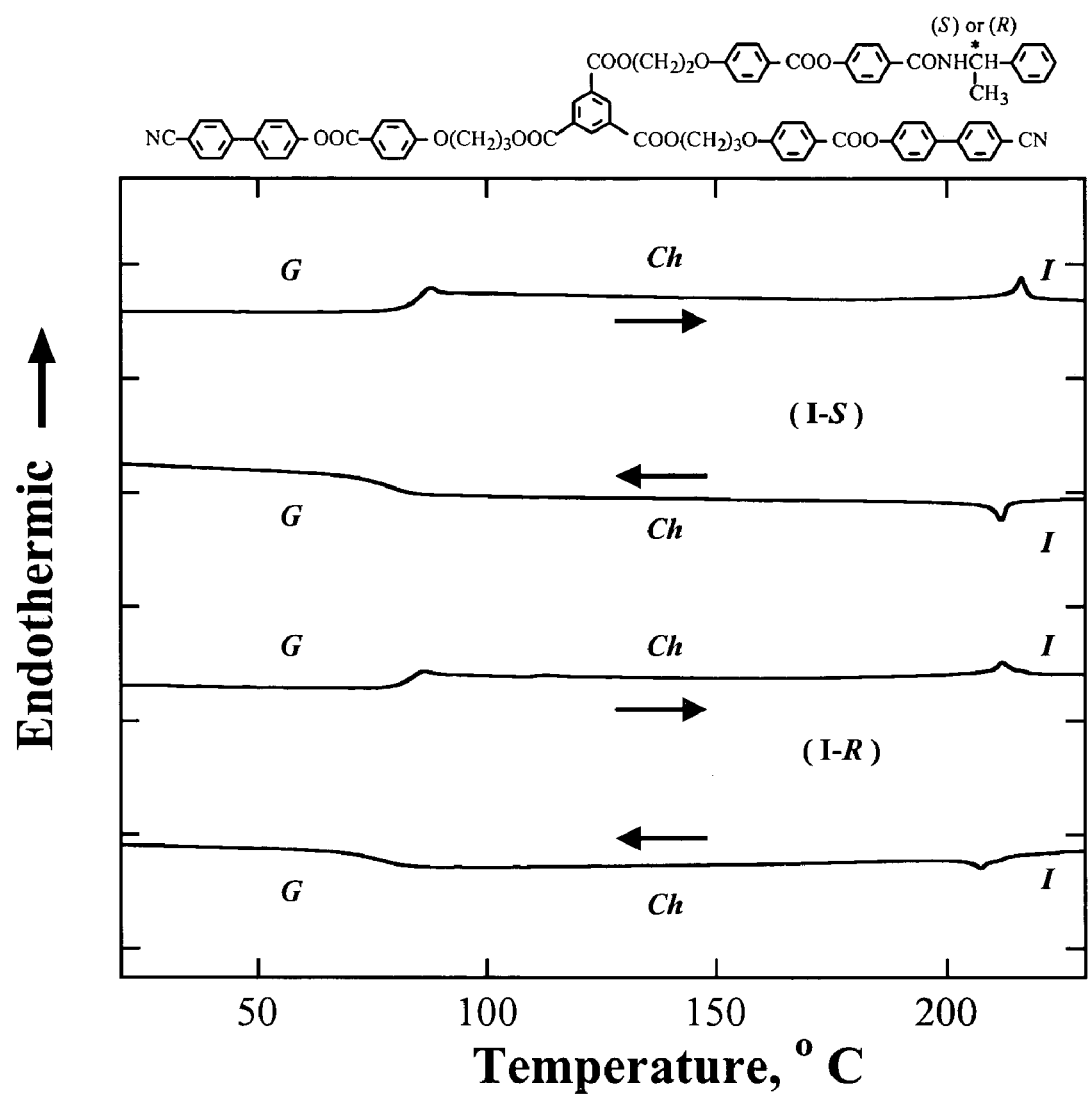
FIG. 2 depicts DSC heating and cooling scans at ±20° C./min of samples of compounds I-R and I-S preheated to beyond $T_c$, the symbols having the following meanings: G, glassy; Ch, cholesteric; I, isotropic.

Shown in FIG. 2 are the first cooling and the second heating scans, obtained as described above, for compounds I-R and I-S, where the liquid crystalline order prevails below $T_g$. As shown by the DSC thermograms, I-R and I-S are morphologically stable glassy chiral nematics with a $T_{g\ at}$ 86° C. and a $T_c$ at 216° C. The heating and cooling scans exhibit no crystallization, indicating the morphological stability of these glassy liquid crystals.

Figure 3:
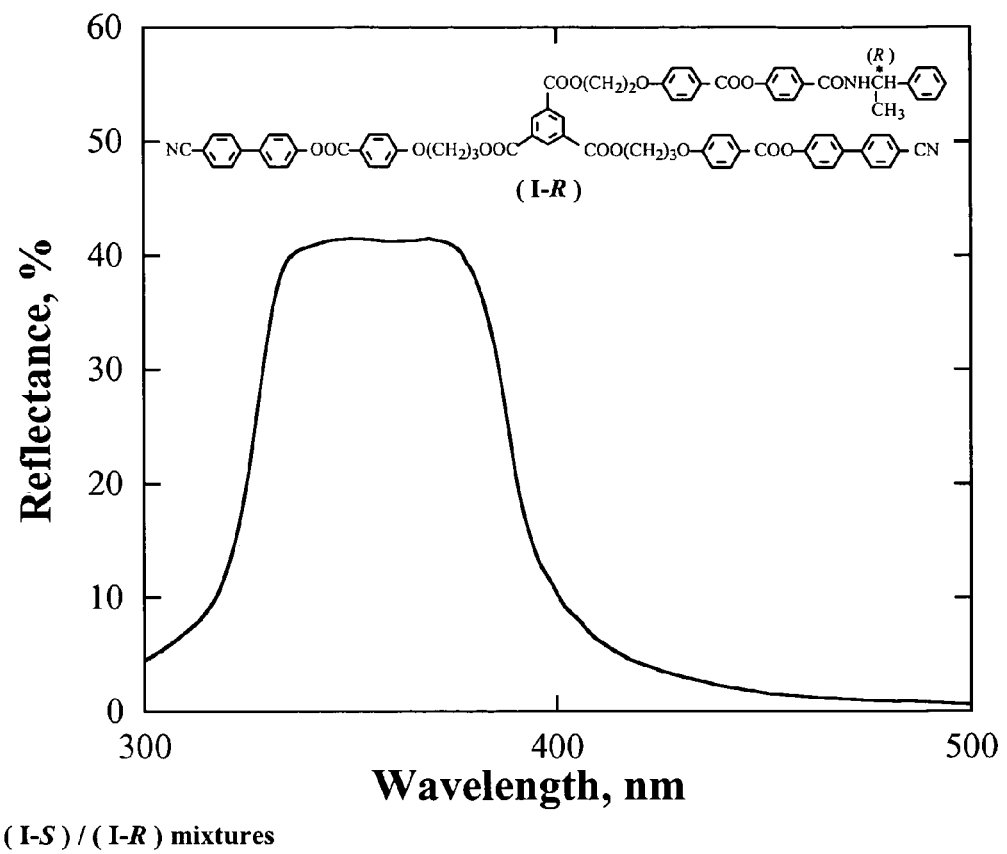
FIG. 3 is the reflectance spectrum obtained using a 4-μm-thick film of compound I-R.

A 4-μm-thick monodomain film of I-S, which has a left-handed helical structure, yields a selective reflection band in the UV-region and a p=188 nm. The reflectance spectrum from the I-S film is shown in FIG. 3.

Figure 4:
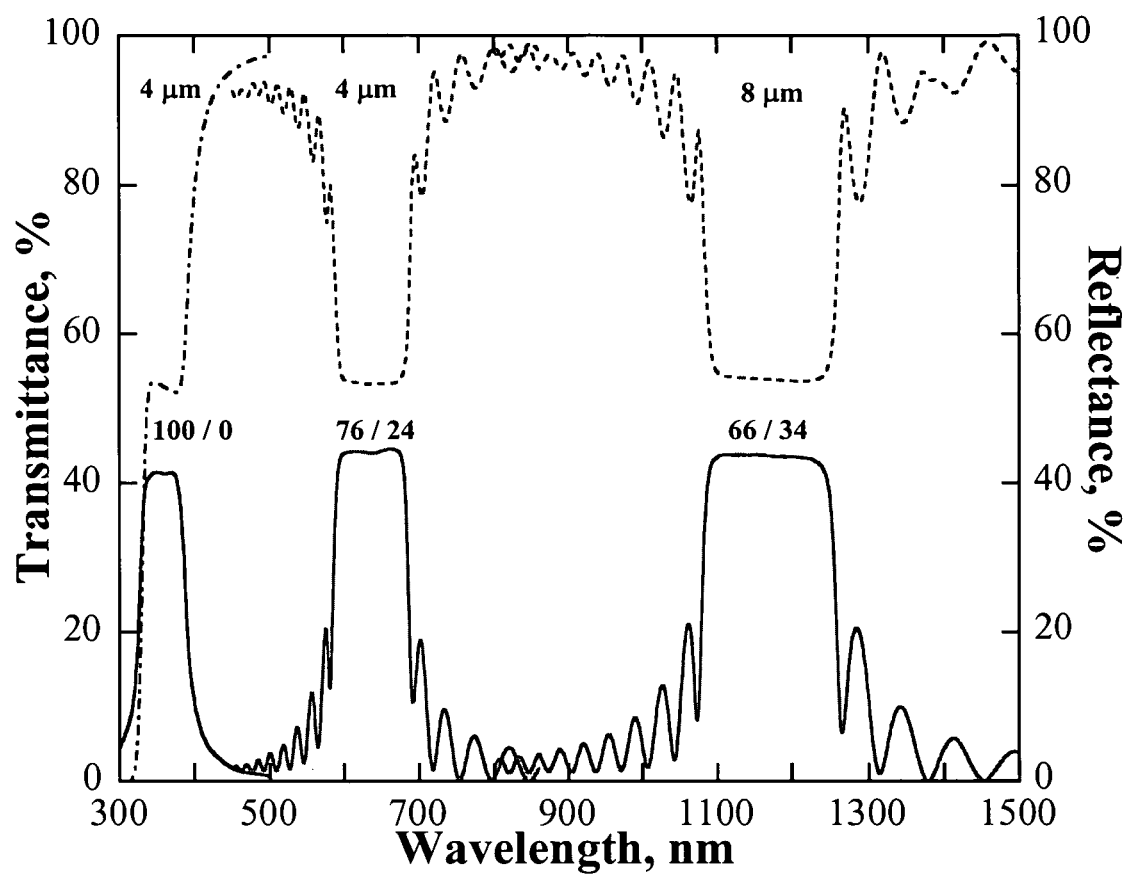
FIG. 4 depicts the transmission (in dotted curves) and reflection (in solid curves) spectra of films comprising three mixtures of compounds I-S/I-R at mass ratios of 100/0, 76/24, and 66/34.

Individual films comprising pure I-S and I-R are essentially circular polarizers of opposite handedness, and a stack of the two films is expected to constitute an optical notch filter, all in the UV-region. Mixtures of I-S and I-R at varying ratios can be readily prepared for the fabrication of circular polarizers, notch filters, and reflectors across the visible to the infrared region. FIG. 4 depicts the transmission (in dotted curves) and reflection (in solid curves) spectra of films comprising three mixtures of compounds I-S/I-R at mass ratios of 100/0, 76/24, and 66/34.

Figure 5:
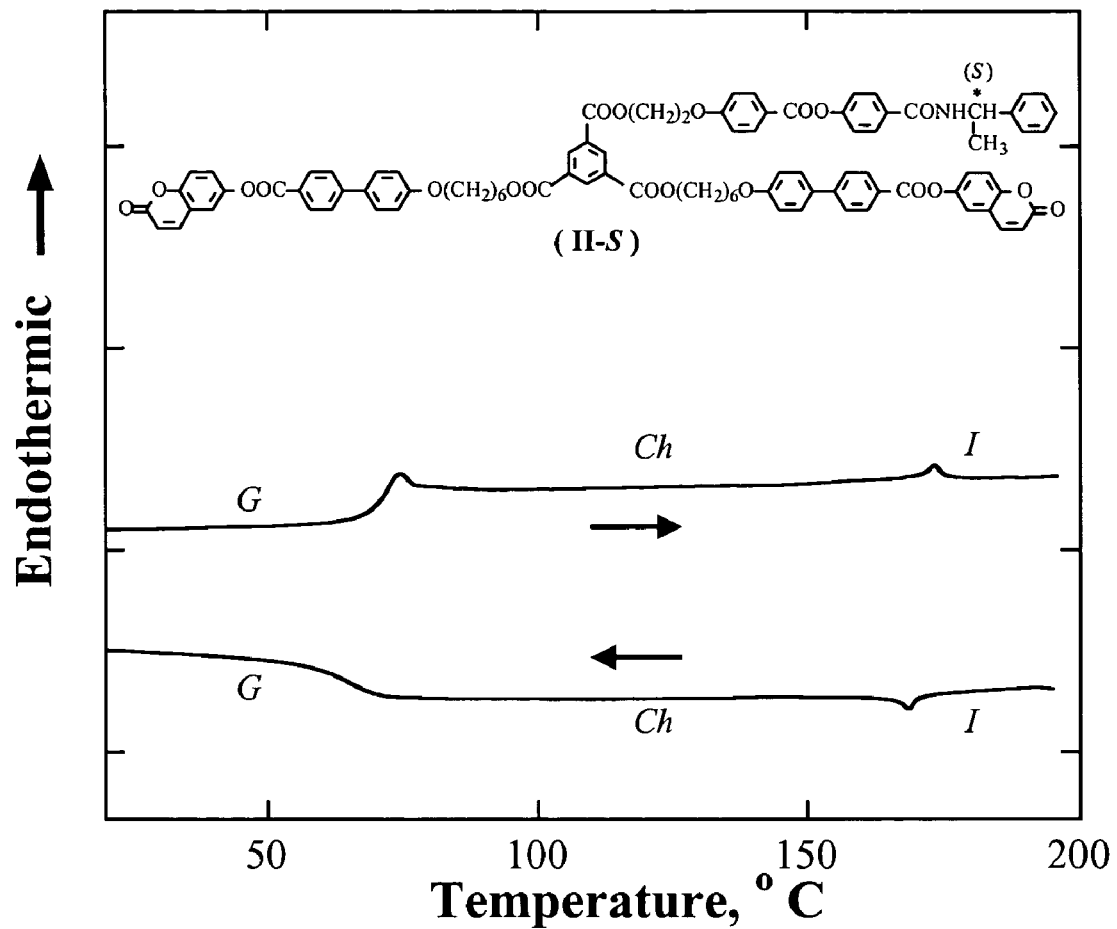
FIG. 5 depicts DSC heating and cooling scans at ±20° C./min of a sample of compound II-S preheated to beyond $T_c$, the symbols having the following meanings: G, glassy; Ch, cholesteric; I, isotropic.
Figure 6:
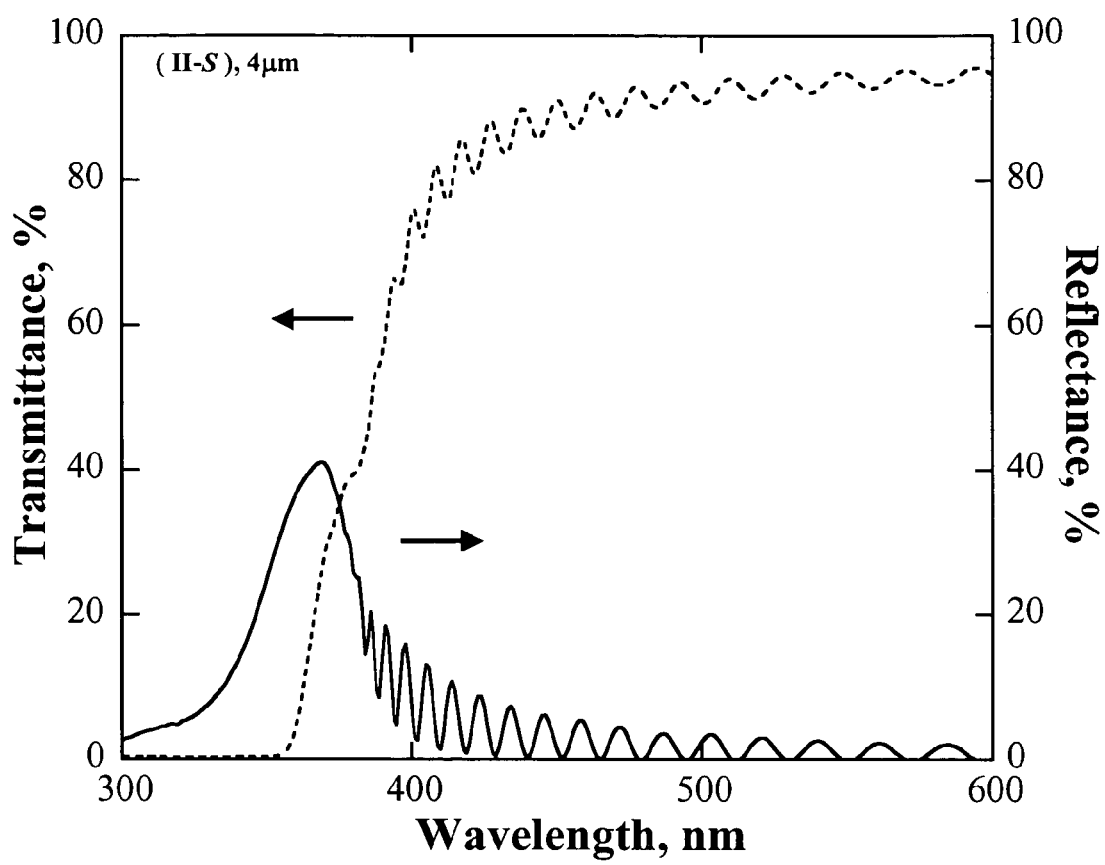
FIG. 6 depicts the transmission (in dotted curve) and reflection (in solid curve) spectra of a 4-micron thick film of compound 11-S.

FIG. 5 depicts the first cooling and the second DSC heating scans for compound II-S. FIG. 6 contains the transmission (dotted) and reflection (solid) spectra of a 4-micron thick film of compound II-S.

Figure 7:
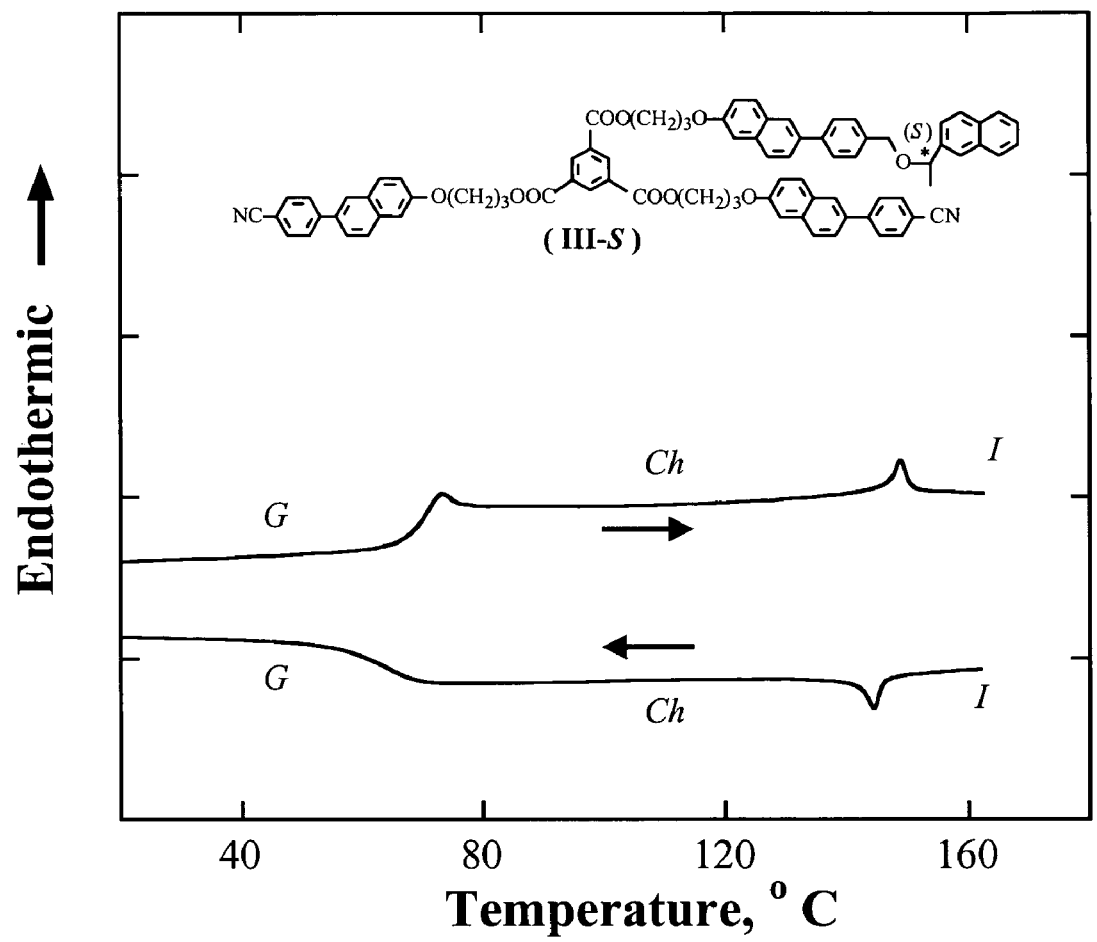
FIG. 7 depicts DSC heating and cooling scans at ±20° C./min of a sample of compound III-S preheated to beyond $T_c$, the symbols having the following meanings: G, glassy; Ch, cholesteric; I, isotropic.
Figure 8:
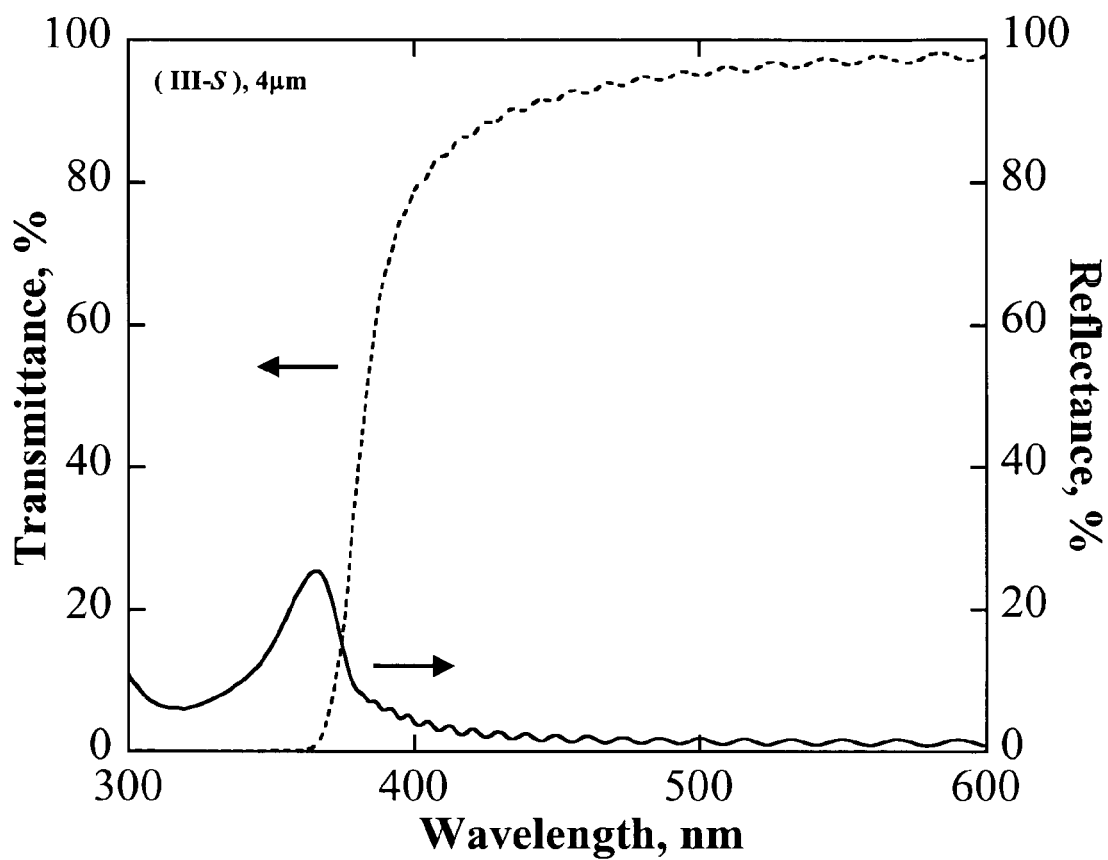
FIG. 8 depicts the transmission (in dotted curve) and reflection (in solid curve) spectra of a 4-micron thick film of compound III-S.

Shown in FIG. 7 are the first cooling and the second DSC heating scans for compound III-S, and FIG. 8 depicts the transmission (in dotted curve) and reflection (in solid curve) spectra of a 4-micron thick film of compound III-S.

Figure 9:
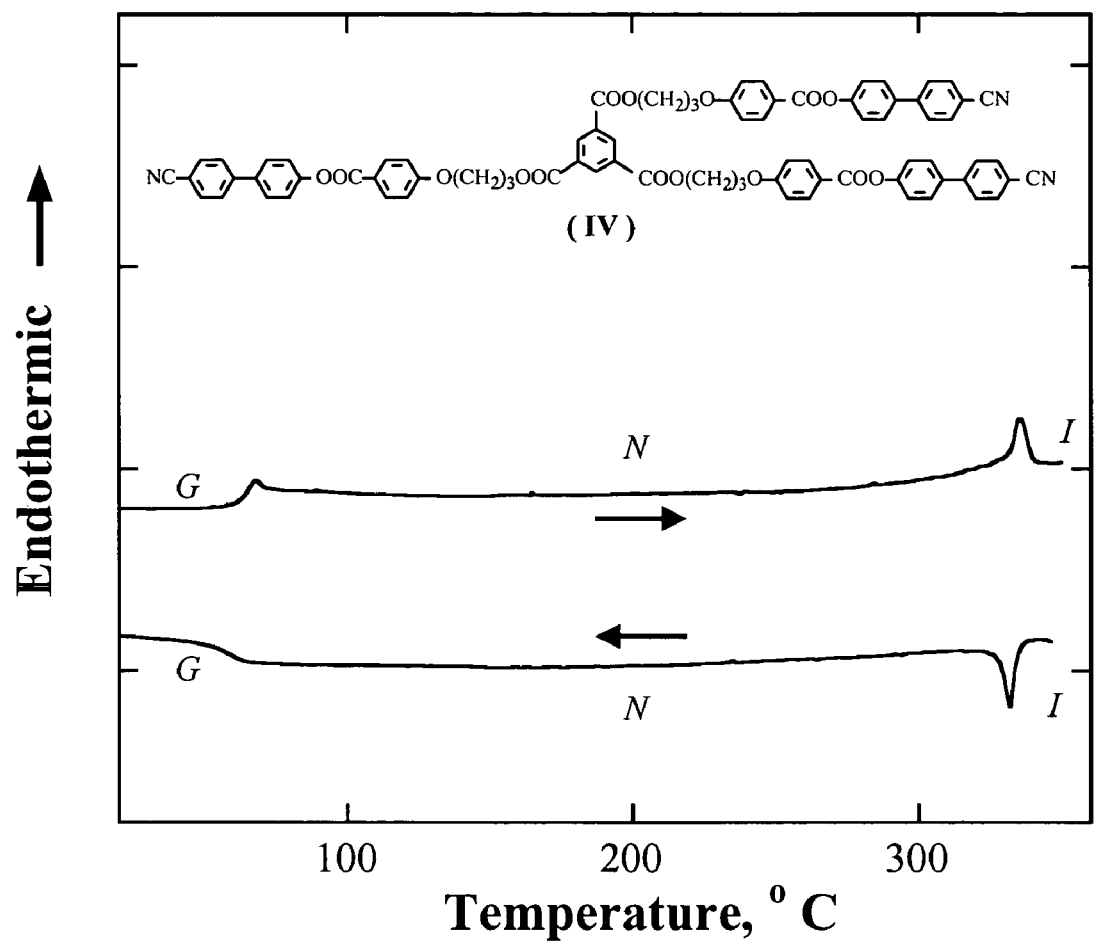
FIGS. 9 and 10 depict DSC heating and cooling scans at ±20° C./min of samples of compounds IV and V, respectively, the symbols having the following meanings: G, glassy; N, nematic; I, isotropic.
Figure 10:
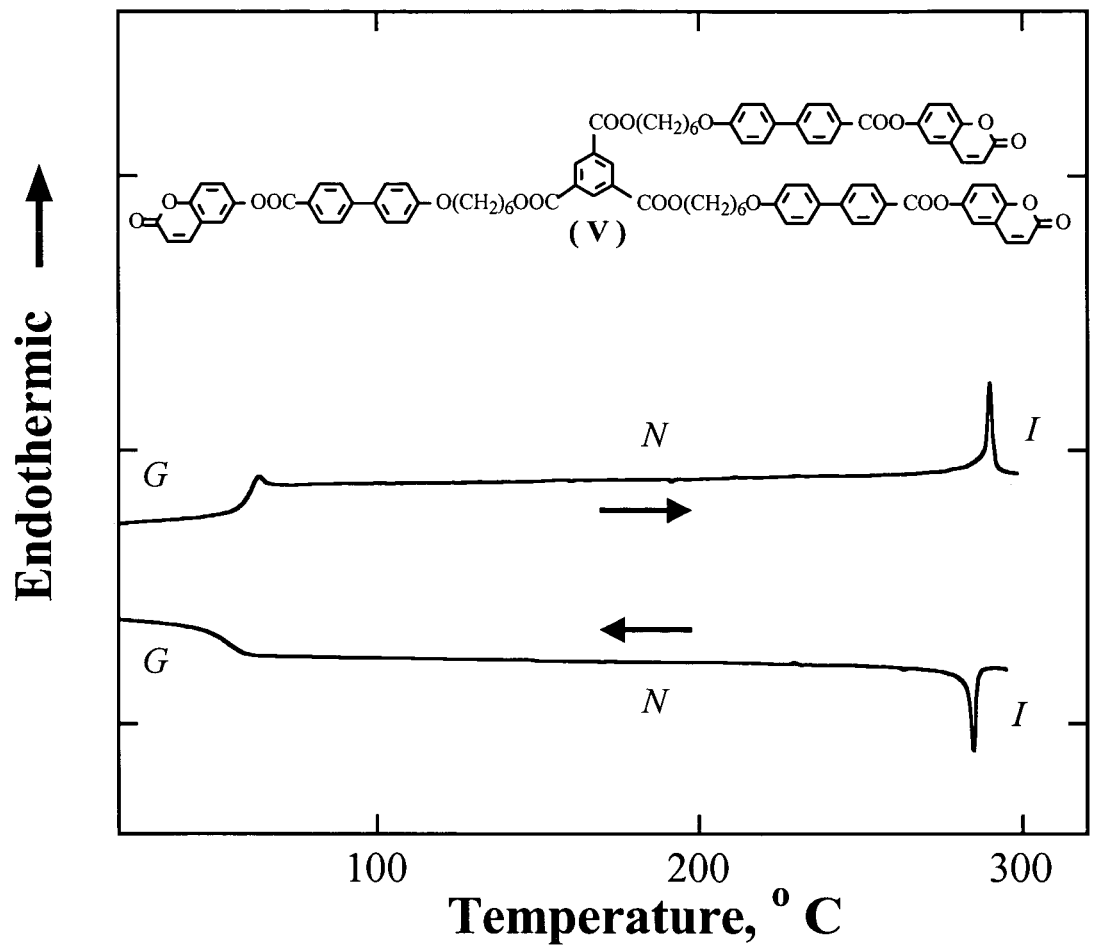

FIGS. 9 and 10 contain the first cooling and the second heating scans, obtained as described above, for compounds IV and V, respectively, where the liquid crystalline order prevails below $T_g$. The liquid crystalline IV and V, which each contain three nematic substituents and thus are not chiral, can be used in combination with chiral-nematic liquid crystalline compounds to tune reflection wavelength in optical devices.

Left at room temperature for up to two years, glassy chiral-nematic films prepared in accordance with the present invention show no evidence of crystallization, a demonstration of long-term morphological stability.

The invention has been described in detail for the purpose of illustration, but it is understood that such detail is solely for that purpose, and variations can be made by those skilled in the art without departing from the spirit and scope of the invention, which is defined by the following claims.

What is claimed is:

1. A glassy chiral-nematic liquid crystal composition comprising a compound having a 1, 3, 5-benzenetricarbonyl central moiety, said composition being characterized by a morphologically stable cholesteric phase and said compound having the structural formula

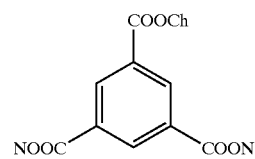

wherein each N represents a nematic group connected to said central moiety by a carboxylic ester linkage and Ch represents a chiral group connected to said central moiety by a carboxylic ester linkage.

2. The composition of claim 1 wherein said nematic group N includes a biphenyl or a terphenyl moiety.

3. The composition of claim 2 wherein said nematic group N is a 4-(1-propylene-3-oxy)-benzoic acid 4'-cyanobiphenyl-4-yl ester group or a 3-(4'-cyano-p-terphenyloxy)-1propyl group.

4. The composition of claim 1 wherein said nematic group N includes a coumarin moiety.

5. The composition of claim 4 wherein said nematic group N is a 4'-(6-hexyleneoxy)-[1,1'-biphenyl]-4-carboxylate acid, 4-(6-coumarin) ester.

6. The composition of claim 1 wherein said nematic group N includes a naphthyl moiety.

7. The composition of claim 1 wherein said chiral group Ch includes an ether or an ester of a chiral alcohol.

8. The composition of claim 1 wherein said chiral group Ch es an amide of a chiral amine.

9. The composition of claim 8 wherein said chiral group Ch es an (S)— or an (R)-1-(phenylethyl) amide moiety.

10. The composition of claim 1 wherein said chiral group Ch es a (+)-estrone ether or ester moiety.

11. The composition of claim 1 wherein said chiral group Ch is an (S)-2'-4-[1-(2-naphthyl)ethoxymethyl]phenyl-6'-ethyleneoxy-naphthalene group.

12. The composition of claim 1 wherein said chiral and nematic groups are selected from, respectively, the following groups of chiral Ch and nematic N groups

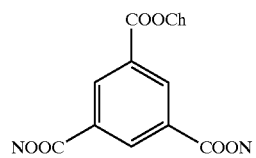

n = 2–6; M = 1–6

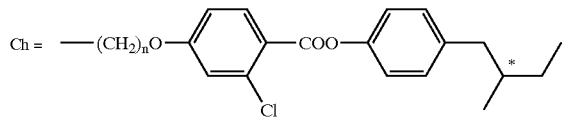 

-continued
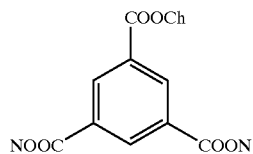
n = 2–6; M = 1–6
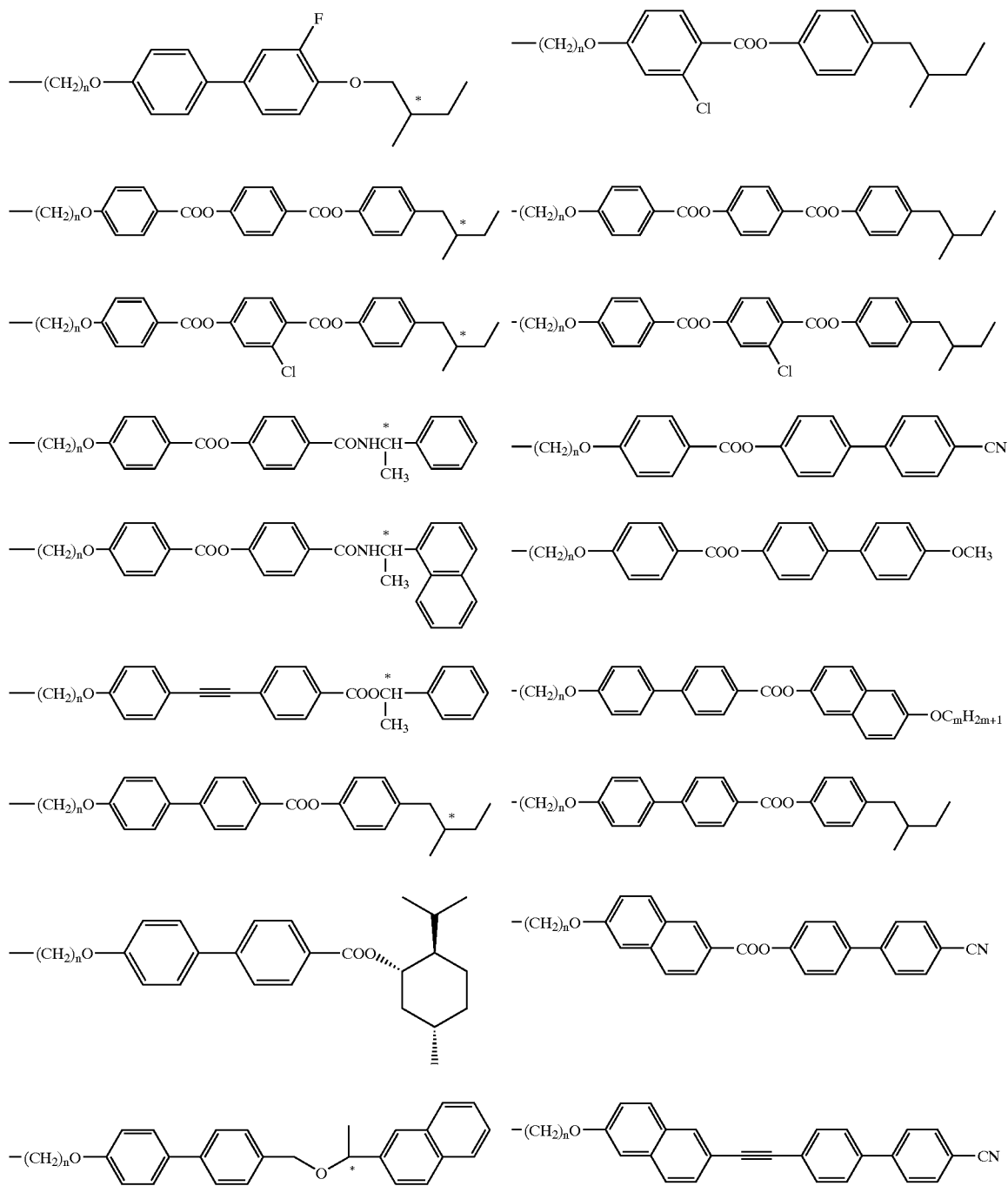

-continued

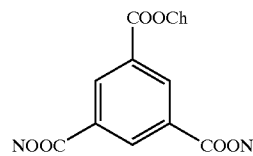

n = 2–6; M = 1–6

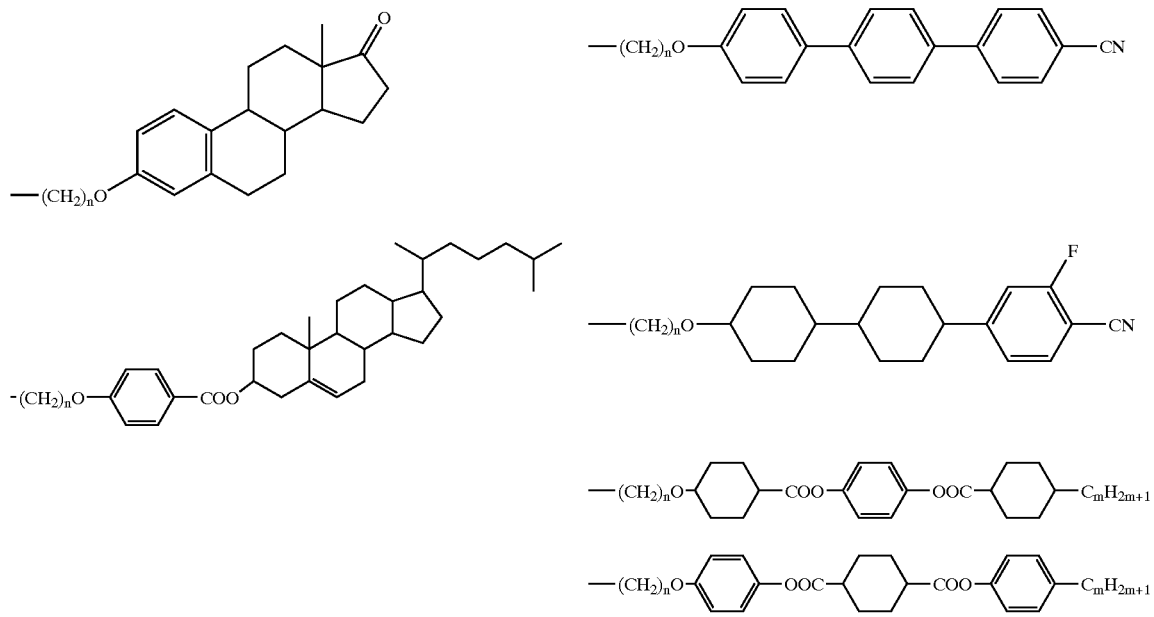

wherein n represents an integer from 2 to 6 and m represents an integer from 1 to 6.

13. The composition of claim 1 wherein said compound is selected from the group consisting of 1,3,5-benzenetricarboxylic acid, 1,3-bis-{3-[4-(4'-cyano-biphenyl-4-yloxycarbonyl)-phenoxy]-propyl ester}, 5-{[4-[[4-[(R)-(+)-[(phenylethyl)]benzamide]-1-oxy]benzoate-1-oxy] ethyl ester} (I-R), 1,3,5-benzenetricarboxylic acid, 1,3-bis-{3-[4-(4'cyano-biphenyl-4-yloxycarbonyl)phenoxy]-propyl ester}, 5-{[4-[[4-[(S)-(−)-1-(phenylethyl)]benzamide]-1-oxy]benzoate-1-oxy] ethyl ester} (I-S), and mixtures thereof.

14. The composition of claim 1 wherein said compound is selected from the group consisting of 1,3,5-benzenetricarboxylic acid, 1,3-bis-{4-[(6-coumarin)-yloxycarbonyl]-4'-biphenoxy] hexyl ester}, 5-{[4-[[4-[(R)-(+)-1-(phenylethyl)]benzamide]-1-oxy]benzoate-1-oxy] ethyl ester} (II-R), 1,3,5-benzenetricarboxylic acid, 1,3-bis-{4-[(6-coumarin)-yloxycarbonyl]-4'-biphenoxy] hexyl ester}, 5-{[4-[[4-[(S)-(+)-1-(phenylethyl)]benzamide]-1-oxy]benzoate-1-oxy] ethyl ester} (II-S), and mixtures thereof.

15. The composition of claim 1 wherein said compound is selected from the group consisting of 1,3,5-benzenetricarboxylic acid, 1,3-bis-{[6-(4'-cyanophenyl)₂-naphthyloxy]-1-propyl ester}, 5-{6-[1-[1-(R)-(2-naphthylethyl)oxo]benzyl9-2-naphthyloxy]-1-propyl ester} (III-R), 1,3,5-benzenetricarboxylic acid, 1,3-bis-{[6-(4'-cyanophenyl) 2-naphthyloxy]-1-propyl ester}, 5-{6-[1-[1-(S)-(2-naphthyl-ethyl)oxo]benzyl]-2-naphthyloxy]-1-propyl ester} (III-S), and mixtures thereof.

16. The composition of claim 1 further comprising a glassy nematic liquid crystal compound selected from the group consisting of 1,3,5-tris-{3-[4-(4'cyano-biphenyl-4-yloxycarbonyl)-phenoxy]-propyl ester} (IV) and 1,3,5-tris-{4-[(6-coumarin)-yloxycarbonyl]-4'-biphenoxy] hexyl ester} (V).

17. An optical device formed from at least one glassy chiral-nematic liquid crystal composition comprising a compound having a 1, 3, 5-benzenetricarbonyl central moiety, said composition being characterized by a morphologically stable cholesteric phase and said compound having the structural formula

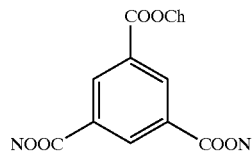

wherein each N represents a nematic group connected to said central moiety by a carboxylic ester linkage and Ch represents a chiral group connected to said central moiety by a carboxylic ester linkage.

18. The optical device of claim 17 wherein said nematic group N includes a biphenyl or terphenyl moiety.

19. The optical device of claim 18 wherein said nematic group N is a 4-(1-propylene-3-oxy)-benzoic acid 4'-cyano-biphenyl-4-yl ester group or a 3-(4'-cyano-p-terphenyloxy)-1-propyl group.

20. The optical device of claim 17 wherein said nematic group N includes a coumarin moiety.

21. The optical device of claim 20 wherein said nematic group N is a 4'-(6-hexyleneoxy)-[1,1'-biphenyl]-4-carboxylate acid, 4-(6-coumarin) ester.

22. The optical device of claim 17 wherein said nematic group N includes a naphthyl moiety.

23. The optical device of claim 17 wherein said chiral group Ch includes an ether or an ester of a chiral alcohol.

24. The optical device of claim 17 wherein said chiral group Ch includes an amide of a chiral amine.

25. The optical device of claim 24 wherein said chiral group Ch includes an (S)— or an (R)-1-(phenylethyl) amide moiety.

26. The optical device of claim 17 wherein said chiral group Ch includes a (+)-estrone ether or ester moiety.

27. The optical device of claim 17 wherein said chiral and nematic groups are selected from, respectively, the following groups of chiral Ch and nematic N groups

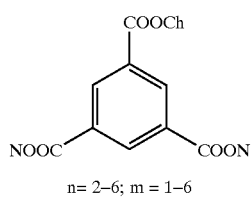

n= 2–6; m = 1–6

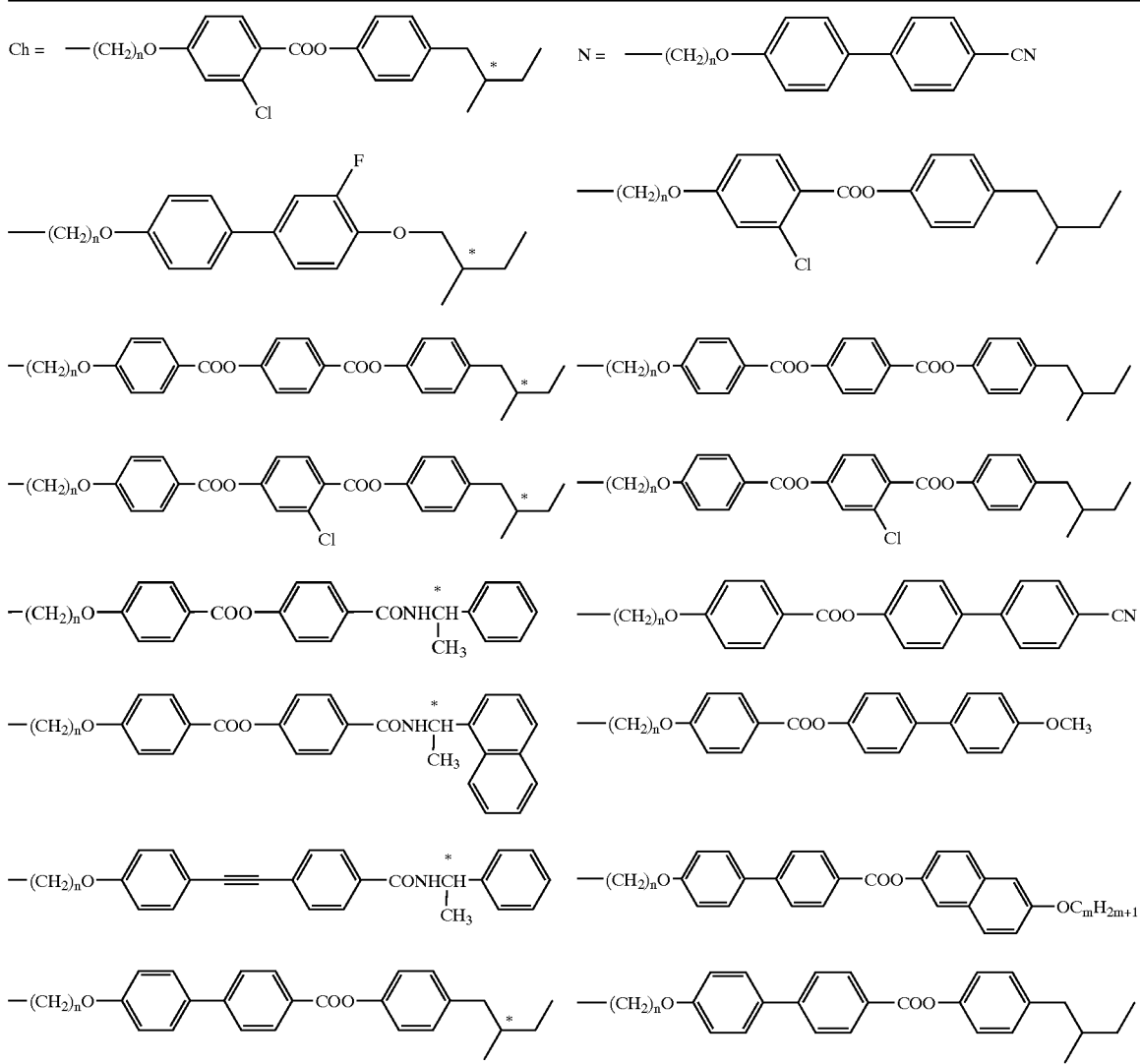

-continued

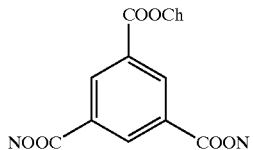

n= 2–6; m = 1–6

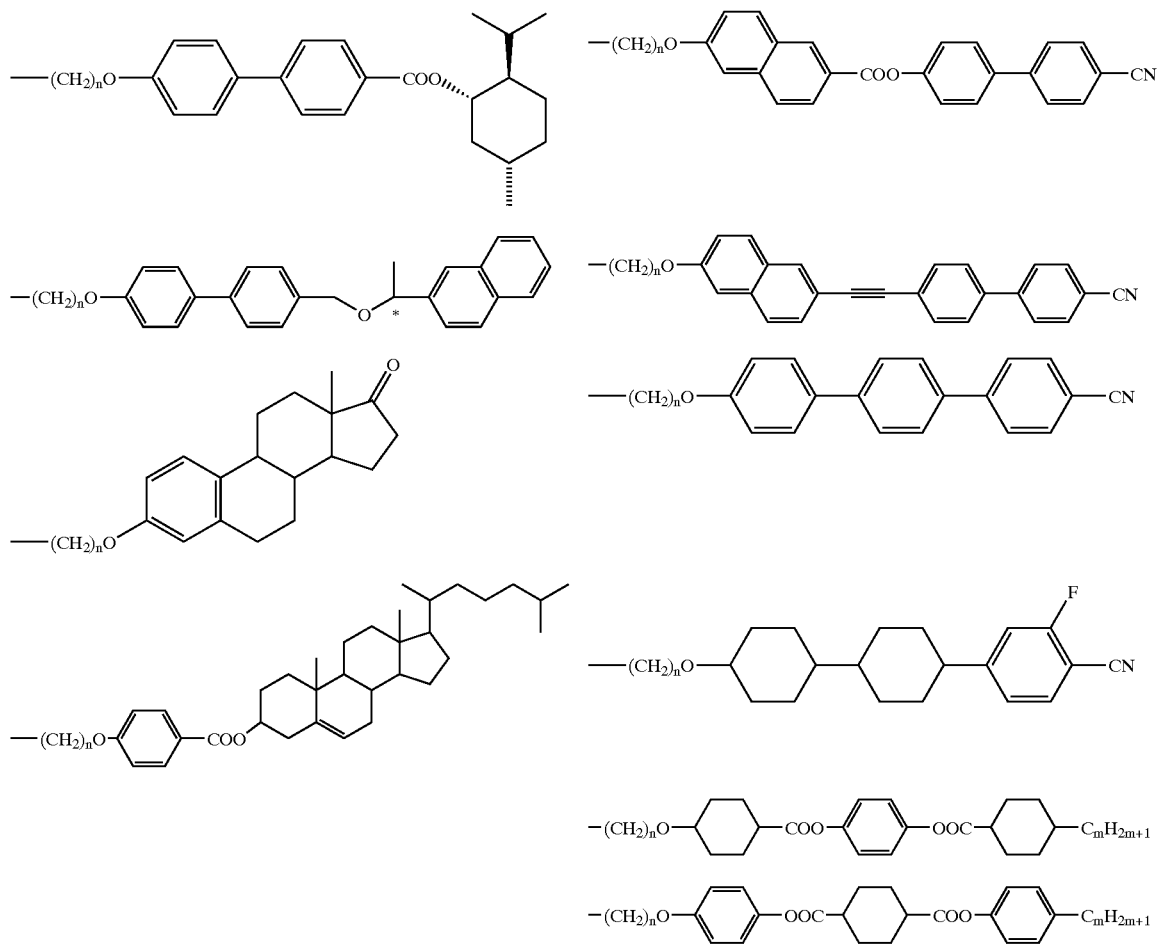

wherein n represents an integer from 2 to 6 and m represents an integer from 1 to 6.

in n represents an integer from 2 to 6 and m represents an integer from 1 to 6.

28. The optical device of claim 17 wherein said compound is selected from the group consisting of 1,3,5-benzenetricarboxylic acid, 1,3-bis-{3-[4-(4'cyano-biphenyl-4-yloxycarbonyl)-phenoxy]-propyl ester}, 5-{[4-[[4-[(R)-(+)-1-(phenylethyl)]benzamide]-1-oxy]benzoate-1-oxy] ethyl ester} (I-R), 1,3,5-benzenetricarboxylic acid, 1,3-bis-{3-[4-(4'cyano-biphenyl-4-yloxycarbonyl)-phenoxy]-propyl ester}, 5-{[4-[[4-[(S)-(−)-1-(phenylethyl)]benzamide]-1-oxy]benzoate-1-oxy] ethyl ester} (II-S), and mixtures thereof.

29. The optical device of claim 17 wherein said compound is selected from the group consisting of 1,3,5-benzenetricarboxylic acid, 1,3-bis-{4-[(6-coumarin)-yloxycarbonyl]-4'-biphenoxy] hexyl ester}, 5-{[4-[[4-[(R)-(+)-1-(phenylethyl)]benzamide]-1-oxy]benzoate-1-oxy] ethyl ester} (II-R), 1,3,5-benzenetricarboxylic acid, 1,3-bis-{4-[(6-coumarin)-yloxycarbonyl]-4'-biphenoxy] hexyl ester}, 5-{[4-[[4-[(S)-(+)-1-(phenylethyl)]benzamide]-1-oxy]benzoate-1-oxy] ethyl ester} (II-S), and mixtures thereof.

30. The optical device of claim 17 wherein said compound is selected from the group consisting of 1,3,5-benzenetricarboxylic acid, 1,3-bis-{[6-(4'-cyanophenyl) 2-naphthyloxy]-1-propyl ester}, 5-{6-[1-[1-(R)-(2-naphthylethyl)oxo]benzyl]-2-naphthyloxy]-1-propyl ester} (III-R), 1,3,5-benzenetricarboxylic acid, 1,3-bis-{[6-(4'-cyanophenyl) 2-naphthyloxy]-1-propyl ester}, 5-{6-[1-[1-(S)-(2-naphthylethyl)oxo]benzyl]-2-naphthyloxy]-1-propyl ester} (III-S), and mixtures thereof.

31. The optical device of claim 17 comprising a said compound having a 1,3,5-benzenetricarbonyl central moiety and a glassy nematic liquid crystal compound selected from the group consisting of 1,3,5-tris-{3-[4-(4'cyano-biphenyl- 4-yloxycarbonyl)-phenoxy]-propyl ester} (IV) and 1,3,5-tris-{4-[(6-coumarin)-yloxycarbonyl]-4'-biphenoxy] hexyl ester} (V).

32. The optical device of claim 17 comprising at least one film formed from at least one said glassy chiral-nematic liquid crystal composition.

33. The optical device of claim 32 further comprising an optically clear substrate.

34. The optical device of claim 32 wherein said film further comprises a nematic liquid crystal compound.

35. The optical device of claim 17 selected from the group consisting of a circular polarizer, an optical notch filter, and a reflector.

* * * * *